United States Patent
Chen et al.

(10) Patent No.: US 10,765,257 B2
(45) Date of Patent: Sep. 8, 2020

(54) MODULARIZED FOOD PREPARATION DEVICE AND TRAY STRUCTURE FOR USE THEREOF

(71) Applicant: Serenete Corporation, Lawrenceville, GA (US)

(72) Inventors: Haidee Chen, Larenceville, GA (US); Helen Chen, Lawrenceville, GA (US); Timothy Chen, Lawrenceville, GA (US)

(73) Assignee: SERENETE CORPORATION, Lawrenceville, GA (US)

( * ) Notice: Subject to any disclaimer, the term of this patent is extended or adjusted under 35 U.S.C. 154(b) by 0 days.

(21) Appl. No.: 15/005,916

(22) Filed: Jan. 25, 2016

(65) Prior Publication Data

US 2016/0206132 A1    Jul. 21, 2016

Related U.S. Application Data

(63) Continuation-in-part of application No. 14/171,539, filed on Feb. 3, 2014, and a continuation-in-part of application No. 14/171,578, filed on Feb. 3, 2014, and a continuation-in-part of application No. PCT/US2015/036534, filed on Jun. 18, 2015.

(60) Provisional application No. 62/013,843, filed on Jun. 18, 2014, provisional application No. 62/018,935, filed on Jun. 30, 2014.

(51) Int. Cl.
| | |
|---|---|
| *A47J 27/00* | (2006.01) |
| *A47J 36/32* | (2006.01) |
| *A47J 44/00* | (2006.01) |
| *B01F 15/02* | (2006.01) |
| *A47J 27/12* | (2006.01) |
| *A47J 27/13* | (2006.01) |

(52) U.S. Cl.
CPC ............ *A47J 36/321* (2018.08); *A47J 27/12* (2013.01); *A47J 44/00* (2013.01); *B01F 15/02* (2013.01); *B01F 15/0291* (2013.01); *A47J 27/13* (2013.01)

(58) Field of Classification Search
CPC ... A47J 37/1228; B01F 15/0237; B01F 15/02; B01F 15/0291; G07F 17/0078; G07F 17/0085
USPC ...... 99/334, 325, 326, 339; 222/53, 144, 14, 222/166, 630, 636, 637
See application file for complete search history.

(56) References Cited

U.S. PATENT DOCUMENTS

| | | | | |
|---|---|---|---|---|
| 3,127,067 A | * | 3/1964 | Hall ........................ | D06F 39/02 222/165 |
| 3,237,804 A | * | 3/1966 | Bardy ..................... | G07F 9/105 198/448 |

(Continued)

FOREIGN PATENT DOCUMENTS

| | | |
|---|---|---|
| CN | 86205953 U | 6/1987 |
| CN | 2032584 U | 2/1989 |

(Continued)

OTHER PUBLICATIONS

ISR and Written Opinion in PCT/US2015/014322 dated May 11, 2015.

(Continued)

*Primary Examiner* — Reginald Alexander
(74) *Attorney, Agent, or Firm* — Mahamedi IP Law LLP

(57) ABSTRACT

A food preparation device or system which utilizes pre-packaged food containers to prepare a food item for consumption.

11 Claims, 17 Drawing Sheets

(56) References Cited

U.S. PATENT DOCUMENTS

| | | | | |
|---|---|---|---|---|
| 3,244,328 | A | * | 4/1966 | Brown .................. B30B 15/306 |
| | | | | 141/9 |
| 3,357,598 | A | * | 12/1967 | Kraft .................... B67D 1/0043 |
| | | | | 137/889 |
| 4,005,668 | A | * | 2/1977 | Washington ......... A24D 3/0225 |
| | | | | 141/129 |
| 4,478,356 | A | * | 10/1984 | Roggenburg, Jr. .. A47K 5/1208 |
| | | | | 222/207 |
| 4,503,502 | A | | 3/1985 | Chapin |
| 4,649,810 | A | | 3/1987 | Wong |
| 4,919,950 | A | | 4/1990 | Mak |
| 4,944,218 | A | | 7/1990 | Cresson |
| 5,029,520 | A | * | 7/1991 | Okada .................. A47J 37/1228 |
| | | | | 221/150 HC |
| 5,132,914 | A | | 7/1992 | Cahlander |
| 5,244,019 | A | * | 9/1993 | Derby ........................ B65B 1/26 |
| | | | | 141/314 |
| 5,386,762 | A | | 2/1995 | Gokey |
| 5,522,309 | A | | 6/1996 | Mizobuchi |
| 6,539,841 | B1 | | 4/2003 | Spasovski |
| 6,647,864 | B1 | | 11/2003 | Fang |
| 6,789,067 | B1 | | 9/2004 | Liebenow |
| 6,843,166 | B1 | | 1/2005 | Li |
| 7,174,830 | B1 | | 2/2007 | Dong |
| 7,665,398 | B2 | | 2/2010 | Gerber |
| 7,673,775 | B2 | * | 3/2010 | Penciu ................ B01F 13/1058 |
| | | | | 222/144 |
| 7,789,111 | B2 | * | 9/2010 | Luehrsen ............ B01F 13/1058 |
| | | | | 141/104 |
| 8,710,408 | B2 | | 4/2014 | Khatchadourian |
| 8,813,635 | B2 | | 8/2014 | Dragn |
| 8,820,219 | B2 | | 9/2014 | Buehler |
| 8,835,816 | B2 | | 9/2014 | McIntyre |
| 9,022,081 | B2 | | 5/2015 | Armonstrong |
| 9,361,746 | B2 | | 6/2016 | Otzen |
| 9,364,106 | B1 | | 6/2016 | Ortiz |
| 9,445,614 | B2 | | 9/2016 | Storek |
| 10,064,521 | B1 | | 9/2018 | Gawali |
| 2002/0083842 | A1 | | 7/2002 | Kown |
| 2004/0006949 | A1 | | 1/2004 | Danby |
| 2004/0011006 | A1 | | 1/2004 | Sus et al. |
| 2004/0173103 | A1 | | 9/2004 | Won |
| 2004/0238555 | A1 | * | 12/2004 | Parks ....................... G07F 9/105 |
| | | | | 221/80 |
| 2005/0166548 | A1 | | 8/2005 | Lavi |
| 2005/0193901 | A1 | | 9/2005 | Buehler |
| 2007/0254080 | A1 | | 11/2007 | Schachmuth |
| 2008/0099462 | A1 | | 5/2008 | Wang |
| 2008/0124434 | A1 | | 5/2008 | Hrudka |
| 2008/0178749 | A1 | | 7/2008 | Stutman |
| 2009/0212044 | A1 | | 8/2009 | Stanton |
| 2010/0116845 | A1 | | 5/2010 | Penciu |
| 2010/0175352 | A1 | | 7/2010 | Soloman |
| 2010/0196561 | A1 | | 8/2010 | Kling |
| 2010/0303972 | A1 | | 12/2010 | Srivastava |
| 2011/0151074 | A1 | | 6/2011 | Titen et al. |
| 2011/0253482 | A1 | | 10/2011 | Purgatorio |
| 2011/0300270 | A1 | | 12/2011 | Koppens |
| 2012/0132642 | A1 | | 5/2012 | Broders |
| 2012/0156337 | A1 | | 6/2012 | Studor et al. |
| 2012/0185086 | A1 | | 7/2012 | Khatchadourian |
| 2013/0059024 | A1 | | 5/2013 | Leconte |
| 2013/0133520 | A1 | | 5/2013 | Hulett |
| 2013/0171304 | A1 | | 7/2013 | Huntley |
| 2014/0230660 | A1 | | 8/2014 | He |
| 2014/0377417 | A1 | | 12/2014 | Martinez |
| 2015/0088304 | A1 | | 3/2015 | Ameye |
| 2015/0107463 | A1 | | 4/2015 | Lehman |
| 2015/0114236 | A1 | | 4/2015 | Roy |
| 2015/0147441 | A1 | | 5/2015 | Lagerlof |
| 2015/0216362 | A1 | | 8/2015 | Chen et al. |
| 2015/0216363 | A1 | | 8/2015 | Chen et al. |
| 2015/0238046 | A1 | | 8/2015 | Xu |
| 2015/0290795 | A1 | | 10/2015 | Oleynik |
| 2015/0320260 | A1 | | 11/2015 | Takahashi |
| 2016/0015219 | A1 | | 1/2016 | Rosalia et al. |
| 2016/0150915 | A1 | | 6/2016 | Yu |
| 2017/0150843 | A1 | | 6/2017 | Rosalia et al. |
| 2018/0157232 | A1 | | 6/2018 | Chen |
| 2018/0213976 | A1 | | 8/2018 | Chen et al. |
| 2019/0231147 | A1 | | 8/2019 | Chen et al. |

FOREIGN PATENT DOCUMENTS

| | | |
|---|---|---|
| CN | 2502864 Y | 7/2002 |
| CN | 102501242 A | 6/2012 |
| CN | 102717599 A | 10/2012 |
| CN | 202781874 U | 3/2013 |
| EP | 441397 A1 | 8/1991 |
| EP | 427358 B1 | 5/1995 |
| FR | 2743695 A1 | 7/1997 |
| TW | 201236568 | 9/2012 |
| WO | WO 92/17313 | 10/1992 |
| WO | WO 2008/083516 A1 | 7/2008 |
| WO | WO 2012-135917 | 10/2012 |
| WO | WO 2014/132559 A1 | 9/2014 |
| WO | WO 2015/117156 A1 | 8/2015 |
| WO | WO 2015/195985 A1 | 12/2015 |
| WO | WO 2015/195986 A1 | 12/2015 |
| WO | WO 2016/149686 A1 | 9/2016 |
| WO | WO 2017/192765 | 9/2017 |
| WO | WO 2018/089946 A1 | 5/2018 |

OTHER PUBLICATIONS

ISR and Written Opinion in PCT Application No. PCT/US2015/036534 dated Aug. 28, 2015.

ISR and Written Opinion in PCT/US2015/036535 dated Oct. 7, 2015.

Office Action dated Feb. 5, 2018, Application CN 2015800148726. 11 pages. Search report in English.

Omelette NPL, published Jun. 24, 2013, https://web.archive.org/web20130624004517/http://www.eggs.ca:80/recipes/basic-omelette. 2 pages.

Extended European Search Report dated Aug. 16, 2017, for related application No. 15742991.1, filed May 3, 2017, 7 pages.

International Search Report and the Written Opinion of the International Searching Authority dated Aug. 11, 2016, for related PCT Application No. PCT/US2016/023310 filed Mar. 18, 2016, 7 pages.

International Search Report and the Written Opinion of the International Searching Authority dated Aug. 24, 2017, for related PCT Application No. PCT/US2017/030911 filed Mar. 3, 2017, 6 pages.

European Search Report dated Mar. 5, 2018, Application No. 15809674.3 13 pages.

Supplementary European Search Report dated Jul. 17, 2018, Application No. 15809674.3 13 pages.

International Search Report and the Written Opinion of the International Searching Authority dated Feb. 21, 2018, for related PCT Application No. PCT/US17/61406 filed Feb. 18, 2016, 7 pages.

International Preliminary Report on Patentability dated Nov. 15, 2018, for PCT Application No. PCT/US2017/030911, filed May 3, 2017; 5 pages.

First Examination Report dated Jun. 6, 2018, for related application No. 15742991.1, filed May 3, 2017, 5 pages.

Office Action dated Dec. 5, 2018, Application CN 2015800148726, filed Sep. 19, 2016. 9 pages. Search report in English.

First Examination Report dated Jan. 3, 2019, for related application No. 2015210646, filed Jul. 27, 2016, 3 pages.

Notification Concerning Transmittal of International Preliminary Report on Patentability dated Sep. 28, 2017, for related PCT Application No. PCT/US2016/023310 filed Mar. 18, 2016Mar. 18, 2016, 6 pages.

International Preliminary Report on Patentability dated May 23, 2019, for PCT Application No. PCT/US2017/061406, filed Nov. 13, 2018; 6 pages.

Office Action dated Jul. 3, 2019, Application CN 2015800148726, filed Sep. 19, 2016. 11 pages. Search report in English.

(56) References Cited

OTHER PUBLICATIONS

First Examination Report dated Jun. 4, 2019, for related application No. 15742991.1, filed May 3, 2017, 4 pages.
Extended European Search Report dated Dec. 18, 2019, Application No. 17793282.9, filed Nov. 30, 2018, 76 pages.

* cited by examiner

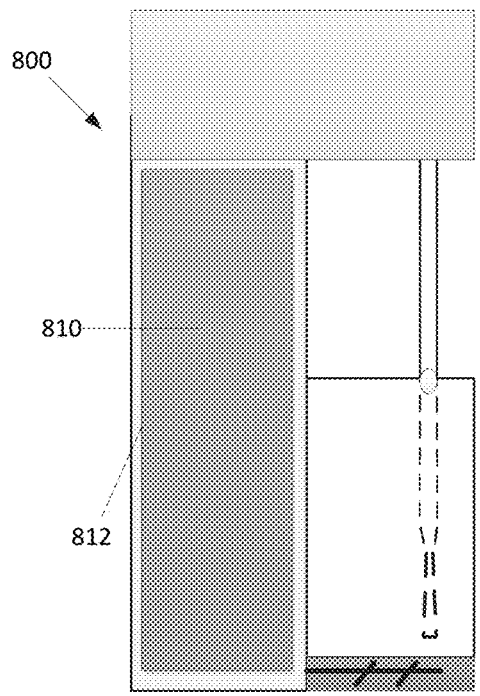
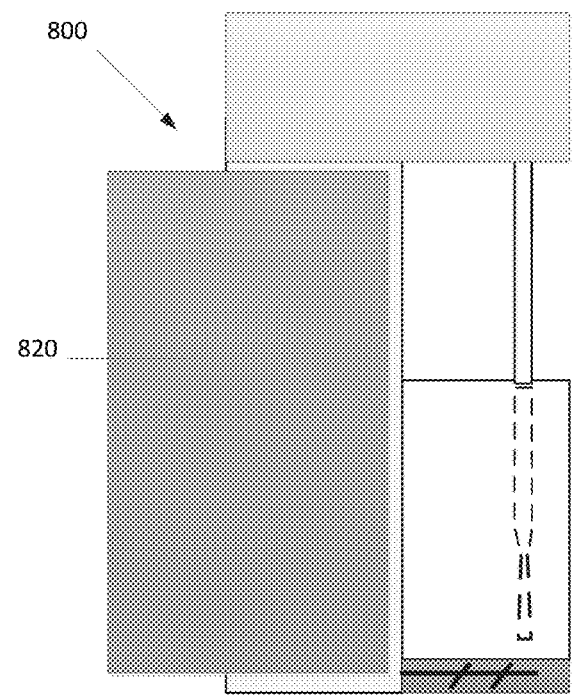
FIG. 8A   FIG. 8B
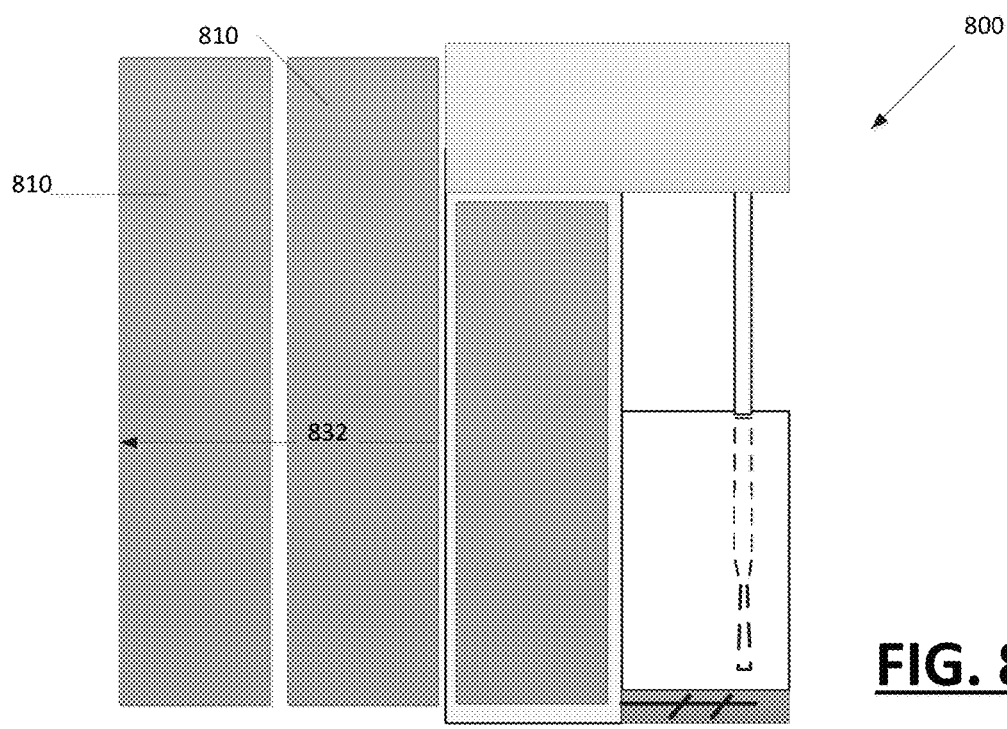
FIG. 8C

MODULARIZED FOOD PREPARATION DEVICE AND TRAY STRUCTURE FOR USE THEREOF

CROSS-REFERENCE TO RELATED APPLICATIONS

This application is a continuation-in-part of each of the following priority applications: (i) U.S. patent application Ser. No. 14/171,539 filed Feb. 3, 2014, (ii) U.S. patent application Ser. No. 14/171,578 filed Feb. 20, 2014, and (iii) PCT/US2015/036534 filed Jun. 18, 2015, which is a PCT of and claims the benefit of U.S. Provisional Patent No. 62/013,843 filed Jun. 18, 2014, and 62/018,935 filed Jun. 30, 2014; each of the aforementioned priority applications being incorporated by reference in their respective entirety for all purposes.

TECHNICAL FIELD

The disclosed embodiments relate generally to a food preparation device, and more specifically, to a modularized food preparation device and tray structure for use thereof.

BACKGROUND

Currently, there exists dried foods that can be mixed with water (e.g., hot water) in order to transform the food item from a dehydrated state into a consumable state (e.g., hot noodle soup). In these products, the end user generally has limited choice other than to select the pre-packaged food item (e.g. Raman, oatmeal), add water and flavor packets. These prepackaged foods are typically laden with preservatives to keep it in a dry state without refrigeration. Typically these dishes also contain high amounts of sodium and other unnatural chemicals.

There also exists microwavable foods, such as frozen foods which can be heated and served.

Coffee machines also exist that provide containers of coffee items (e.g., type of coffee, flavored coffee, mocha etc.). The containers can be placed into a machine that is pre-loaded with water. The machine then brews the coffee using the container.

BRIEF DESCRIPTION OF THE DRAWINGS

FIG. 1O illustrates a variation in which a food preparation device extracts food from a container that is malleable and under vacuum, according to an embodiment.

FIG. 8A-8C illustrate variations to a modularized food preparation device, according to some embodiments.

Figures 1A, 1B:
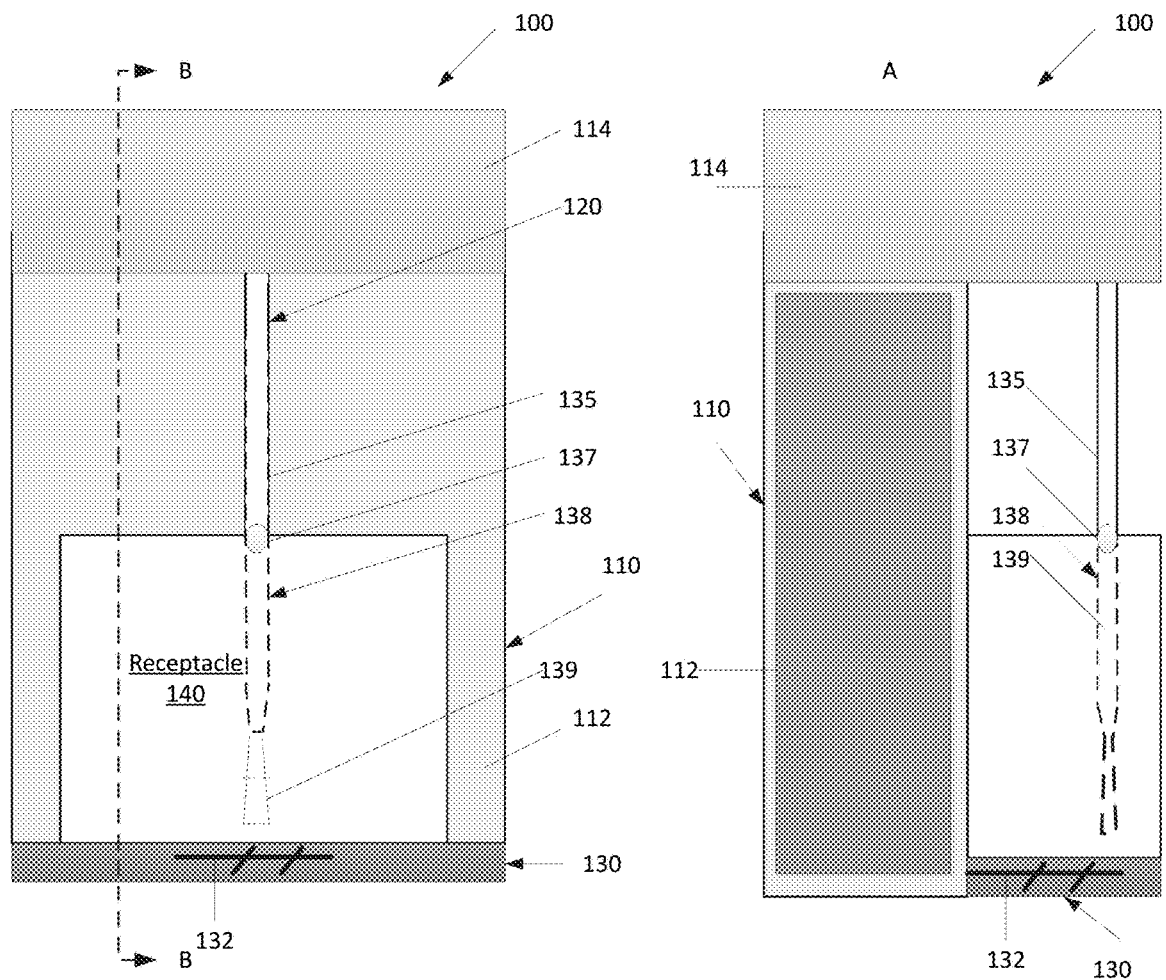
FIG. 1A illustrates a front view of a food preparation device, according to an embodiment.
FIG. 1B illustrates a side view of the food preparation device.

These and other embodiments are described in greater detail below.

DETAILED DESCRIPTION

Embodiments described herein include a food preparation device or system which utilizes pre-packaged food containers to prepare a food item for consumption. The food preparation device can utilize multiple food containers in combining different ingredients (condiments, liquid, solid, and gas) into a meal or dish. In particular, the food preparation device can cook (or heat/cool), mix, manipulate and transform ingredients provided from food containers into a final consumable state.

According to some examples, a food preparation device can include primary and accessory components. The primary and/or accessory components can be modularized, so that individual components that service a particular function can be interchange with similar components, including with components that perform substantially the same function or have the same size. In variations, the modularization can enable components to be interchanged with substantially different primary purposes when used in context of one device. In one implementation, the food preparation device can include compartments which are modularized, including a compartment for storage of food, liquids, waste ("storage compartment") and/or a compartment for cooking, heating, and manipulation ("cooking compartment").

In one aspect, the food preparation device can implement recipes that identify ingredients from food containers (alternatively referred to as "trays"). For example, the food preparation device can download recipes from a network site, receive recipes from a user operating a computing device, or have a remotely located user conduct live telecooking through the internet by manual or automated means. The processes performed by the food preparation device can be determined based at least in part on the recipe in use.

Among other benefits, the food preparation device can use pre-packaged food containers and programmatically controlled mechanisms to automate many of the steps that would otherwise be needed to prepare a meal or dish. For example, an embodiment enables a user to cook a meal in accordance with a recipe by (i) downloading a recipe onto the device, and (ii) inserting food containers that correspond with specific associated ingredients for the recipe. Subsequent processes for introducing ingredients to a cooking dish, heating, flipping, cutting, injecting, pressing, and stirring can be performed programmatically and/or substantially automatically (e.g., performed with little or no user action, such as the user pushing a button to perform a task/multiple tasks such as pouring or heating). In an embodiment, a food preparation device includes a housing, an extraction mechanism, a receptacle, an ingredient-manipulator arm, a heating/cooling mechanism, and a processing resource. The housing includes an opening 115 that is dimensioned to receive a food container ("tray") of a predetermined dimension. The extraction mechanism is provided with the opening 115 to extract a food item from each of the one or more containers. The preparation receptacle receives the food item extracted from each of the one or more containers. The heating/cooling mechanism heats/cools the receptacle when the food items are received. The processing resource identifies a recipe, and determines a set of food containers that include food items specified in the recipe. According to one aspect, a "recipe" is implemented as a set of instructions, implemented as sequence of steps, each of which controls one of the following attributes: (i) ingredient(s) to add (by name, ingredient code, and/or tray address); (ii) liquids to add (by liquid wheel number); (iii) cooking temperature; (iv) arm speed, direction, and strength of manipulation; (v) receptacle coverage; and (vi) time/ Stopping criteria. A food preparation device can implement a recipe by initiating performance of step, adjusting the attributes, and continuing the step until the time elapses or the stopping criteria is achieved; the device then moves on to the next step. The recipe may dictate when the device should stop cooking.

In some examples, a food preparation device is able to download or otherwise receive a premium recipe from a network service. In one implementation, publishers of premium recipes can charge users for utilizing a recipe in connection with operations performed by a food preparation device.

The processing resource can also verify that the set of food containers are correctly positioned in order at the opening 115 of the housing. The processing resource can also control the extraction mechanism in extracting food items specified in the recipe from each container in the set of food containers. Additionally, the processing resource can control heating/cooling mechanism in heating/cooling the preparation receptacle with the specified food items from the recipe.

One or more embodiments described herein can provide for methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines. A programmatic module can also be initiated or executed remotely via the internet (telecooking).

Furthermore, one or more embodiments described herein may be implemented through instructions that are executable by one or more processors. These instructions may be carried on a computer-readable medium.

Food Preparation Device

FIG. 1A and FIG. 1B illustrate a food preparation device, according to some embodiments. More specifically, a food preparation device 100 is able to perform, and thus automate many of the steps needed to prepare a food item, such as a meal, a dish, or cooked food item. Furthermore, in providing a prepared food item, the device 100 can cook, mix and manipulate/transform ingredients. Among other advantages, the device 100 enables users to prepare meals or dishes with minimal user interaction. In this way, the device 100 provides convenience to users, and further enables those individuals who are unable to cook (e.g., elderly, handicapped) to prepare meals with consideration for ingredients and recipes.

As described by examples provided below, the system 100 can be implemented to prepare a meal or dish using prepackaged food containers. By way of example, the food containers can retain food items, which can form the ingredients of a prepared meal or dish. Depending on implementation, the food items retained in the food containers can be raw, partially cooked, or cooked. The device 100 enables individuals to use multiple pre-packaged food containers in order to cook and transform ingredients provided through the food containers.

FIG. 1A and FIG. 1B represent an exterior front and side view of device 100 respectively, according to an embodiment. The device 100 includes a housing 110 having a base 112 and a top segment 114. A bottom plate 130 can extend from the base 112. A food receptacle 140 can be positioned on the bottom plate 130.

In some examples, a food preparation device can include a manipulating member or arm (sometimes called a "manipulator 138" or "arm") to manipulate the food in the receptacle, manipulate the food in the storage compartment, and/or manipulate other functions of the device in lieu of a human manipulator. The manipulator 138 can extend from the top segment 114 into the receptacle.

In some embodiments, both primary and accessory components can be modularized, or made from interchangeable or replaceable components for purpose of altering functionality, use or operation. By way of example, the manipulator, receptacle, tray assembly and spacing of a food preparation device can be modularized.

The receptacle (also called cooking surface) 140 can have anyone of a variety of form factors, such as form factors to resemble a skillet pan or receptacle. In variations, the receptacle can include a flat or curved bottom with rounded sides, designed to both keep food securely in the receptacle as well as provide "warm zones" along the sides (i.e. indirect heating) for zoned cooking. The receptacle may be designed to fit snugly against the edges of the cooking compartment to minimize spillage from depositing ingredients or stirring by the arm.

According to some examples, the receptacle 140 can be secured to the device by magnets, physical clamps, or by a threaded base that is screwed into the main device. The device may support automatic latching and unlatching (or screwing/unscrewing, or automatically energizing the magnetic clamps). The receptacle 140 can also support manual latching and unlatching, screwing or unscrewing, or a passive magnet onto which the user must place the receptacle.

According to some examples, the receptacle 140 can be modularized, and/or made attachable and removable so that the user can select the type of cooking surface to use. The receptacle 140 can be easily detachable and removable for dispensing and cleaning. For example, physical latches can rotationally lock the receptacle 140 in place at, for example, a midpoint of the receptacle's height.

In some examples, the receptacle 140 and/or food preparation device 100 include physical magnetic guides to ensure the receptacle is properly secured into place. The food preparation device 100 can employ sensors 119 in the latch, sensors beneath the receptacle, and/or a magnetic sensor that detects if the receptacle is placed, to ensure that the receptacle is properly secure, or alert the user if it is not. In one example, the food preparation device 100 can employ sensors in the rotating portion of the latch to detect if the latch is or is not lowered. The food preparation device can also provide that the sensors are optical sensors 119, configured to view the receptacle and/or its contents. Such sensors 119 can be used for calibration processes, as described by other examples.

The receptacle 140 can also vary in height as a mechanism to control heat and cooking function (e.g., warming).

The base 112 is dimensioned to retain pre-packaged food containers. In particular, the pre-packaged food containers can be dimensioned and structured to be received within an opening 115 in the bottom interior of the base 112 (see FIG. 1C and FIG. 1D), or within an opening 115 in the top interior of the housing 114 (see FIGS. 1F and 1G). In one implementation shown by FIG. 1C through FIG. 1E, the top segment 114 can provide a mechanism to extract and dispose food items from the pre-packaged containers into the receptacle 140. In another implementation shown by FIGS. 1F and 1G, the top segment 114 provides a mechanism to lower the pre-packaged containers into the interior of the base 112. As an alternative or addition, the device 100 can specify or use opened food containers. For example, the device 100 can be provided with instructions for the user on how to open or use food containers 10 before use.

The bottom plate 130 can include a heater 132. The heater 132 can heat the receptacle and its contents to a temperature that is suitable for cooking. For example, the heater 132 can heat the cooking surface 144 (see FIG. 1I) of the receptacle 140 to a temperature that in a range between, for example, 200-450° F. Such temperatures can be sufficient to cook all types of food. Alternatively, the bottom plate 130 can heat the receptacle 140 to warming temperatures under 200° F. In one implementation, the heater 132 can have multiple coils that can individually control specific temperatures in different areas of the bottom plate 130. For example, when needing to cook vegetables and meat at different temperatures on the same receptacle 140, the temperatures of the left side of the bottom plate 130 can be controlled at 400 degrees Fahrenheit by the associated heating coils, while the right side can be controlled at 200 degrees Fahrenheit by its associated coils. Eventually, foods can be mixed by the manipulator 138 to make the final dish.

In a variation, the bottom plate 130 can also include a cooler (not shown). The cooler can serve to chill foods, either as part of the food preparation step or post preparation (e.g., preservation).

The manipulator 138 can be motorized to swivel, spin or otherwise move within the receptacle 140. An embodiment provides for the manipulator 138 to include a base segment 135, a joint 137, an extension 139, and an end segment 133

Bottom Up Orientation

Figure 1C:
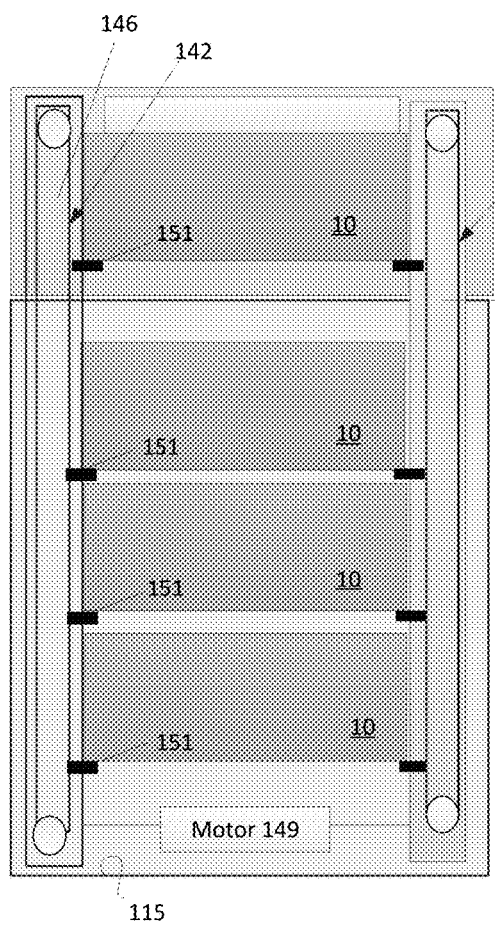
FIG. 1C illustrates a cross-section of the food preparation device along lines A-A of FIG. 1B, according to a top-down orientation, under an embodiment.
Figure 1D:
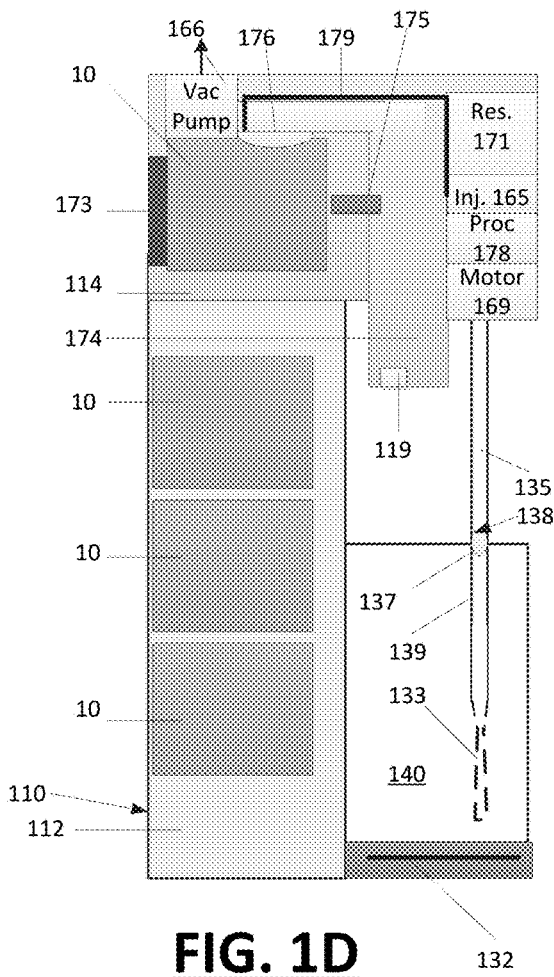
FIG. 1D illustrates a cross-section of the food preparation device along lines B-B of FIG. 1A, according to a top-down orientation, under an embodiment.
Figure 1E:
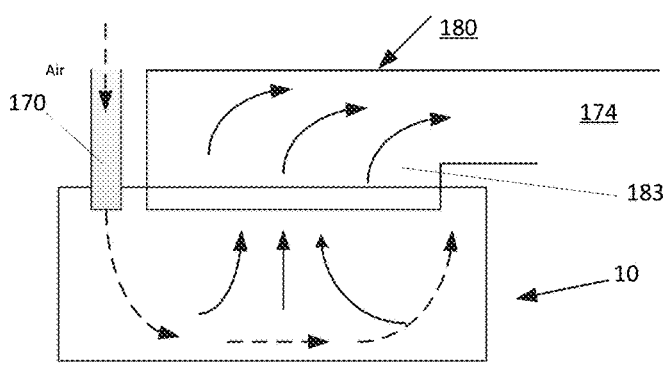
FIG. 1E illustrates the food extraction mechanism of FIG. 1A through FIG. 1D in more detail, according to an embodiment.

Examples described herein include multiple configurations in which food preparation device 100 receives food containers, extracts food items from the containers, distributes the food items into the receptacle 140, and further manipulates, heats and cooks the food items within receptacle. FIGS. 1C, 1D and 1E illustrate a bottom-up orientation in which a food receptacle is received via a bottom opening 115 and directed upwards to a point above the receptacle 140, at which point food extraction takes place and food items are extracted from the containers and dispersed into the receptacle 140.

In more detail, FIG. 1C illustrates a cross-section of device 100 along lines A-A of FIG. 1B. As shown, the base 112 includes the opening 115. In an example of FIG. 1C, multiple food containers 10 are retained. The containers 10 can be provided and combined according to a recipe to prepare a food item, such as a meal or dish. Accordingly, the containers 10 can correspond to ingredients of a meal or dish. In an example shown, the containers 10 are aligned vertically. In variations, the food containers 10 can be aligned horizontally. Still further, the containers 10 can be aligned circuitously. The device 100 includes mechanisms for individually introducing the food containers 10 into the receptacle 140 one at a time or more than one at a time. As shown with, for example, FIG. 9A through FIG. 11, food containers 10 can be housed in a cartridge or carousel for consumption by the food preparation device 100.

Further, in an example of FIG. 1C, a movement mechanism moves the containers 10 upward to a point in the top segment 114 where food items within the container can be extracted and disposed into the receptacle 140. In one embodiment, the movement mechanism corresponds to a conveyer system, including a pair of opposing conveyers 142 that lift the individual containers 10 from the bottom, upwards towards the top segment 114, where extraction of the food item takes place. Each conveyer 142 can include a track member 145, with support structures 147 to support individual containers, while the support structures 147 are moved upward or downward by the conveyers 142. In this way, the plate structures 147 can move upward or downward with motion provided by the track member 145. The track member 145 can be equipped with a motor 149 in order to permit movement of the plate structure 147.

FIG. 1D illustrates a cross-section of device 100 along lines B-B of FIG. 1A. In the example shown, the base 112 is shown to house multiple food containers 10. The top segment 114 retains the container 10 that is being extracted. The food container 10 is pushed upward into the top segment 114. The conveyers 142 push the containers 10 upward to engage an extraction mechanism. The extraction mechanism can include a container interface 176, which interfaces with a surface of the food container 10 to open the container. By way of example, the container interface 176 can include a sharp or pointed structure that punctures the top surface of the container 10. The conveyer 142, or an additional motion mechanism can push the container 10 against the container interface 176 to cause the top surface of the container to partially open (e.g., puncture).

In one implementation, the top segment 114 includes an outlet 174 that receives food items extracted from the food container 10, and dispenses the food items into the receptacle 140. Additionally, in one implementation, the top segment 114 can include components for providing a food extraction mechanism. In the example provided, the food extraction mechanism includes a vacuum pump 166 and an injector 165. The vacuum pump 166 generates a vacuum through the outlet 174, so that food items are sucked from the container 10. The vacuum pump 166 can be extended into the container 10 through the container interface 176.

The injector 165 can pressurize and/or heat liquid or air. A conduit 179 can extend from the injector 165 to the container interface 176 in order to introduce the air/liquid into the container 10, and cause the food items to push out into the outlet 174. A reservoir 171 can be provided in order to receive liquids such as water, for extraction, mixing or introduction into the receptacle 140.

With further reference to FIG. 1D, a manipulator 138 can extend from the top segment 114 of the housing 110. The manipulator 138 is coupled to a motor 169 so that it is motorized to swivel, stir or move to mix food items dispensed in the receptacle 140. The manipulator 138 can include the joint 137, so that the extension 139 can pivot relative to the base segment 135.

FIG. 1D also illustrates a processor 178 for controlling mechanisms of the device 100. In some embodiments, the processor 178 can implement a system such as described with FIG. 3 or FIG. 4. Additionally, in some embodiments, the processor 178 can implement a process such as described with FIG. 5 or with FIG. 6.

With further reference to FIG. 1D, once the food item is dispensed from the container 10, the container 10 can be stacked together and removed using a door 173. The door 173 can be positioned in a rear or side façade of the housing 110. By way of example, the door 173 can be hinged to open outward. In one implementation, the ejection of the used container 10 is automatic, and in response to the food item being dispensed from the container 10. In such an implantation, an ejection mechanism 175, such as a motorized and/or spring-biased push rod, can be used to force the container 10 out of the housing via the door 173. In a variation, the container 10 can be manually removed by a user. As an alternative, an alert can be sounded or displayed to indicate when the user should remove the container 10 from the housing 110.

FIG. 1E illustrates the food extraction mechanism of FIG. 1A through FIG. 1D in more detail, according to an embodiment. According to one example, the food extraction mechanism 180 includes (i) conduit 170 which provides air/liquid injection, which forces one of air or liquid into the container 10, and/or (ii) vacuum interface 183, which generates the vacuum to draw food items out through the outlet 174. The injector 165 (see FIG. 1D) can heat or pressurize air/liquid through the conduit 170 and into the container 10, and the vacuum pump 166 can generate the vacuum to draw the food items from the container 10.

Top Down Orientation

Figure 1F:
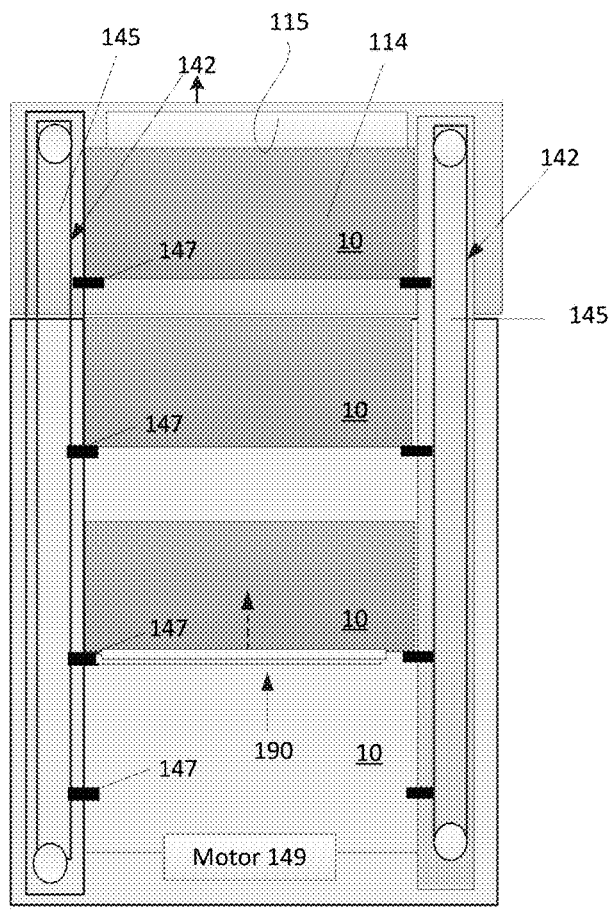
FIG. 1F illustrates a cross-section of the food preparation device along lines A-A of FIG. 1B, according to an up-down orientation, under an embodiment.
Figure 1G:
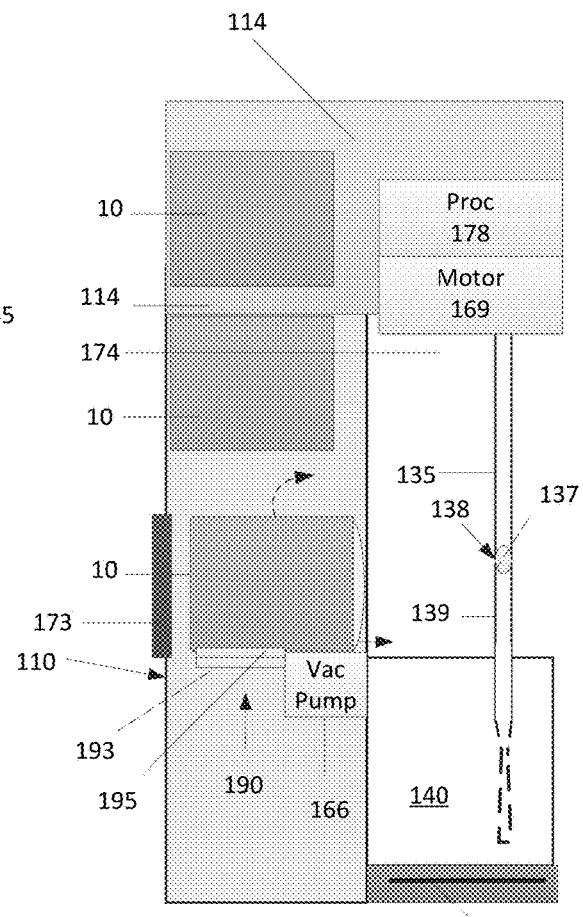
FIG. 1G illustrates a cross-section of the food preparation device along lines B-B of FIG. 1A, according to the up-down orientation, under an embodiment.

In variations, food preparation device 100 can include alternative configurations for the manner in which the food containers is positioned, moved and acted upon to distribute food items. In one implementation, FIG. 1F and FIG. 1G illustrate a top-down orientation, as a variation to an implementation of FIG. 1C and FIG. 1D. With reference to FIG. 1F, the opening 115 can be provided with the top segment 114. For example, the opening 115 can be provided as a top lid of the top segment 114. The conveyers 142 can operate to lower the individual containers from the top segment 114 downward to an extraction point that is in the middle or bottom end of the base 112.

With reference to FIG. 1F and FIG. 1G, the extraction mechanism can be implemented with container interface 176 engaged to unseal an edge or periphery. In FIG. 1G, for example, the container interface 176 can engage a vertical edge of the container 10, and the container 10 can be structured to be unsealable from the corresponding edge. In one implementation, food container 10 can be pre-opened from one side. In a variation, a mechanism such as the container interface 176 can operate to eliminate one side of the food container while it is inside base 112. The vacuum pump 166 can be positioned to draw food items out of the container 10 from the unsealed edge of the container 10.

With further reference to FIG. 1F and FIG. 1G, a lift 190 can be provided as a base for the container 10 that is at the extraction point. The lift 190 can include, for example, an upper member 193 that can pivot upward from a horizontal base segment 195. This can cause the container 10 to tip forward. The tilting facilitates the extraction of food items from the container 10 at the extraction point. In order to enable the container 10 at the extraction point to tilt, additional clearance may be provided for the tipping container 10 with respect to an adjacent container. The additional clearance can enable the lift 190 to tilt the container 10 by some measure or degree forward.

In one variation, the container 10 at the extraction point can also traverse outward over the receptacle 140. For example, the upper member 193 can slide outward over the receptacle 140, and further enable tilting and/or vacuum extraction. In such variations, the tipping container 10 can orient vertically so that the container 10 drops the contents into the receptacle.

Still further, the container 10 at the extraction point can be extended partially outward from the base 112 so that it is partially above the receptacle 140. The lift 190 can slide or otherwise move the container 10 at the extraction point outward over the receptacle. In a variation, another structure such as an ejection mechanism can push the container 10 outward. After the food container is extended over the receptacle 140 it can be rotated from 90-270 degrees in a swivel motion until the ingredients are emptied into the receptacle 140. This process can be repeated every time a new ingredient needs to be added to the receptacle 140.

Thus, examples such as shown by FIG. 1F and FIG. 1G illustrate alternative implementations for orienting containers, and implementing extraction of food items from such containers. While examples of FIG. 1C-1G illustrate variations in arranging in extracting containers in a top-down and bottom up orientation, other configurations can also be employed in accordance with embodiments described herein. For example, food items from the container 10 at the extraction point can be scooped out of the container by the jointed food manipulator and placed into the receptacle 140.

Still further, while described examples utilize vacuum and/or injection for extracting the food item from the container 10, variations can provide for use of other types of mechanisms. For example, in one implementation, the top segment 114 or base 112 can be provided with a scooper to scoop the food items from the containers 10. In still another variation, the top segment 114 or base 112 can include a tray that can flip 90 degrees or more in order to dump the food item out. In another variation, the jointed food manipulator 138 can serve as the scooper and scoop or push the food items from the containers 10.

Food Container

Figure 1H:
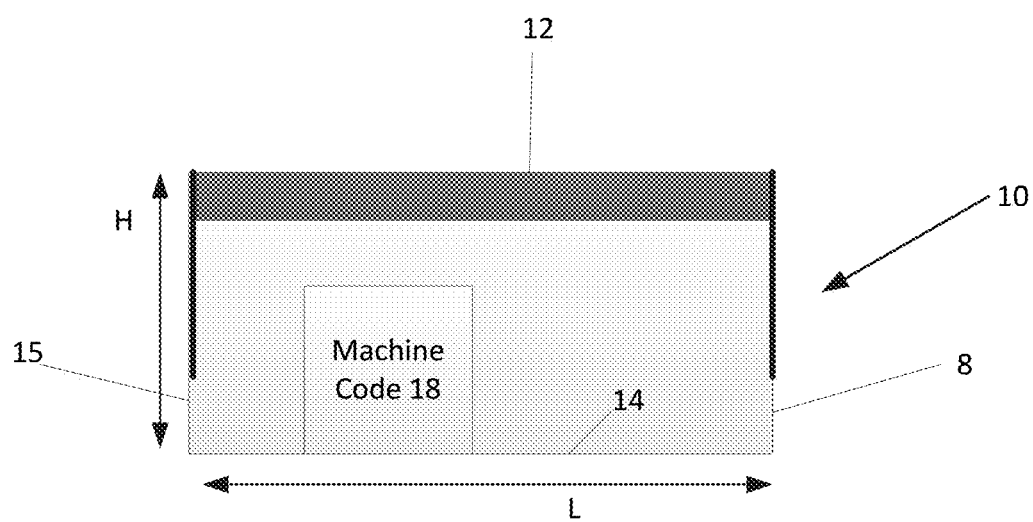
FIG. 1H illustrates an example of a food container for use with one or more examples.

FIG. 1H illustrates an example of a food container 10 for use with one or more examples. The food container 10 can retain food/ingredients in a raw state, partially-cooked state or fully-cooked state. The food item of an individual container 10 can correspond to an ingredient(s) that can be further cooked, manipulated and transformed with other ingredients (provided from other food containers 10). In FIG. 1F, container 10 includes a package 8 having a top surface 12, a bottom base 14 and sidewalls 15. The package 8 can include dimensions of length (L), height (H) or width (not shown). The dimensions of the package 8 can be selected so that the package 8 can fit into the opening 115 of the housing 110 of device 100 (see FIG. 1D). The container 10 may also have a perforated area for insertion of an edge or other tool provided through the container interface 176.

In one aspect, the package 8 includes a machine code identifier 18 provided on a sidewall 15. The machine code identifier 18 can provide one or more of the following: (i) an identifier of the container 10, (ii) identification about the contents of the food container 10, (iii) information about how the contents of the food container 10 are to be used (e.g., heat to certain temperature, etc.), (iv) date of expiration of the ingredients in the food container 10, (v) amount of ingredient in food container 10, and/or (vi) place where ingredients are sourced from and/or purchased from. In another aspect, the package 8 is equipped with a radio-frequency identifier (RFID) tag. A compatible RFID reader (not shown) on the device 100 can detect information (e.g. container identifier, food item contained) about the food container 10.

Figure 1I:
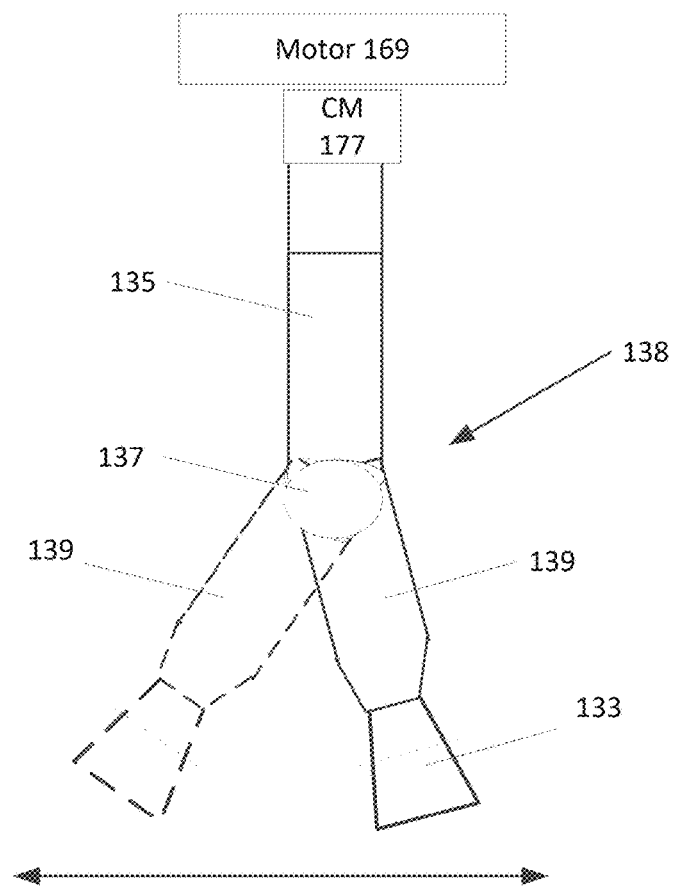
FIG. 1I illustrates a manipulator for food preparation device, according to an embodiment.

FIG. 1I illustrates the manipulator 138 for food preparation device 100, according to an embodiment. In more detail, manipulator 138 includes base segment 135, the joint 137, and one or more end segments 133. The end segment 133 can be detachable, so that different kinds of end segments 133 can be attached and incorporated into the manipulator 138.

The manipulator 138 is attached to the top segment 114 by a motor 149 and a connection mechanism 177. The base segment 135 can rotate horizontally, for example, in a 360 degree motion in conjunction with the connection mechanism 177. The jointed food manipulator 138 can have multiple end segments 133, which can pivot about multiple joints 137 to provide a greater degree of motion within the receptacle 140. The joints 137 can each have an associated motor 149, which allows for locking actions of the joints 137 at specific angles to strengthen the ability of the jointed food manipulator 138 to manipulate the ingredients (e.g. cutting, scooping, flipping, pressing). The joints 137 and extensions may also consist of a spring 101 to prevent over exertion of force against the receptacle.

In one implementation, the end segment 133 can be in the form of a spatula, knife, or spoon, and selected by the user for a particular use. The manipulator 138 can position itself so that it can automatically attach and/or detach each end segment 133 through a twisting and locking motion. These attachments can be incorporated via slots that are readily accessible in base 112.

In operation, the manipulator 138 can be attached to motor 149, and further be provided with a connection mechanism 177 that enables movement of the base segment 135 in multiple degrees of freedom. For example, the combination of the connection mechanism 177 and the motor 149 can enable the base segment 135 to (i) translate in two lateral directions (X, Y) with respect to the receptacle 140, (ii) rotate about the connection mechanism 177, and/or (iii) adjust depth (Z) with respect to the receptacle 138. Additionally, the end segment 133 can pivot about the joint 137 to provide additional freedom of movement. In a variation, the manipulator 138 may also fold itself and retract to the top segment 114 while idle.

The specific type, intensity and degree of movement can be controlled by the processor 178 of the device 100. The user can interface with the processor 178 in order to specify a setting for the action that the manipulator 138 is to perform. In a variation, such as described with an example of FIG. 3, the processor 178 can implement recipe operations, and the setting of the manipulator 138 can be programmatically determined from the recipe.

Figures 1J, 1K, 1L:
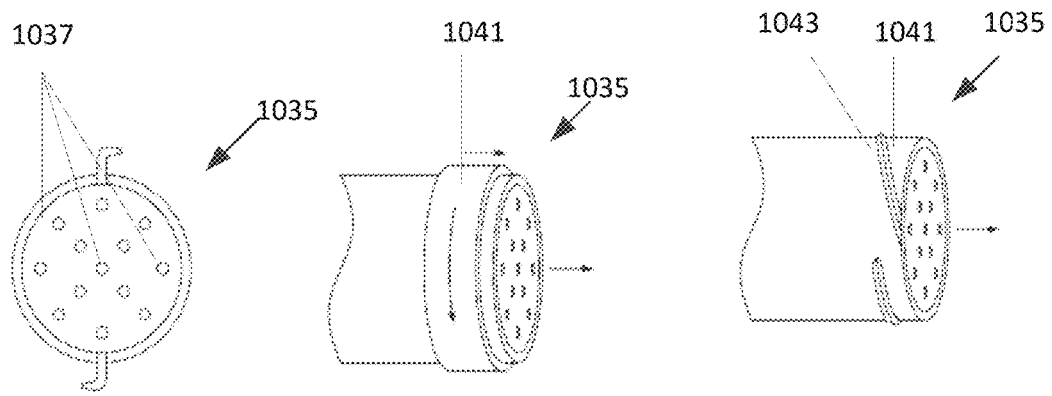
FIGS. 1J, 1K and 1L illustrate variations to a design of a manipulator, according to one or more embodiments.

According to variations shown by FIG. 1J-1L, the manipulator 138 is shown to include a set of internal electromechanical connectors which can extend electrical connectivity from the base 135 to the joint 137 and end piece as needed, in order to enable mechanical and electrical connection with the food preparation device 100. An electro-mechanical member 1035 can include mechanical features such as base segment 135 and joint 137. One or more connectors 1037 can be positioned between the manipulator 138 and the base segment 135 of the food preparation device 100, in order to provide for transmission of power and control signals from the food preparation device 100 to the manipulator 138 and its end pieces. The one or more connectors 1037 can include, for example, electro-mechanical connections, such as provided by a set of electrical contacts.

In an example of FIG. 1K, the manipulator 138 can include a section 1039 that is shrouded in plastic and/or metal, with an outer ring 1041 that can move over the connection and screw or lock the manipulator 138 into place. When the outer ring 1041 is screwed or locked into place, pressure can force the connector pieces together to ensure a secure physical and electrical bond. The resulting bond also provides the manipulator 138 with a stable base to allow force to be transferred to the manipulator instead of back into the base. In FIG. 1L, a variation is provided in which a threaded connection 1043 is included with the outer ring 1041.

In an implementation of a manipulator as illustrated by FIGS. 1J, 1L, and 1K, a seal is created which is waterproof and foodproof is created for a manipulator. For example, the manipulator forms a secure physical and electrical bond which does not pass water and/or food.

Figure 1M:
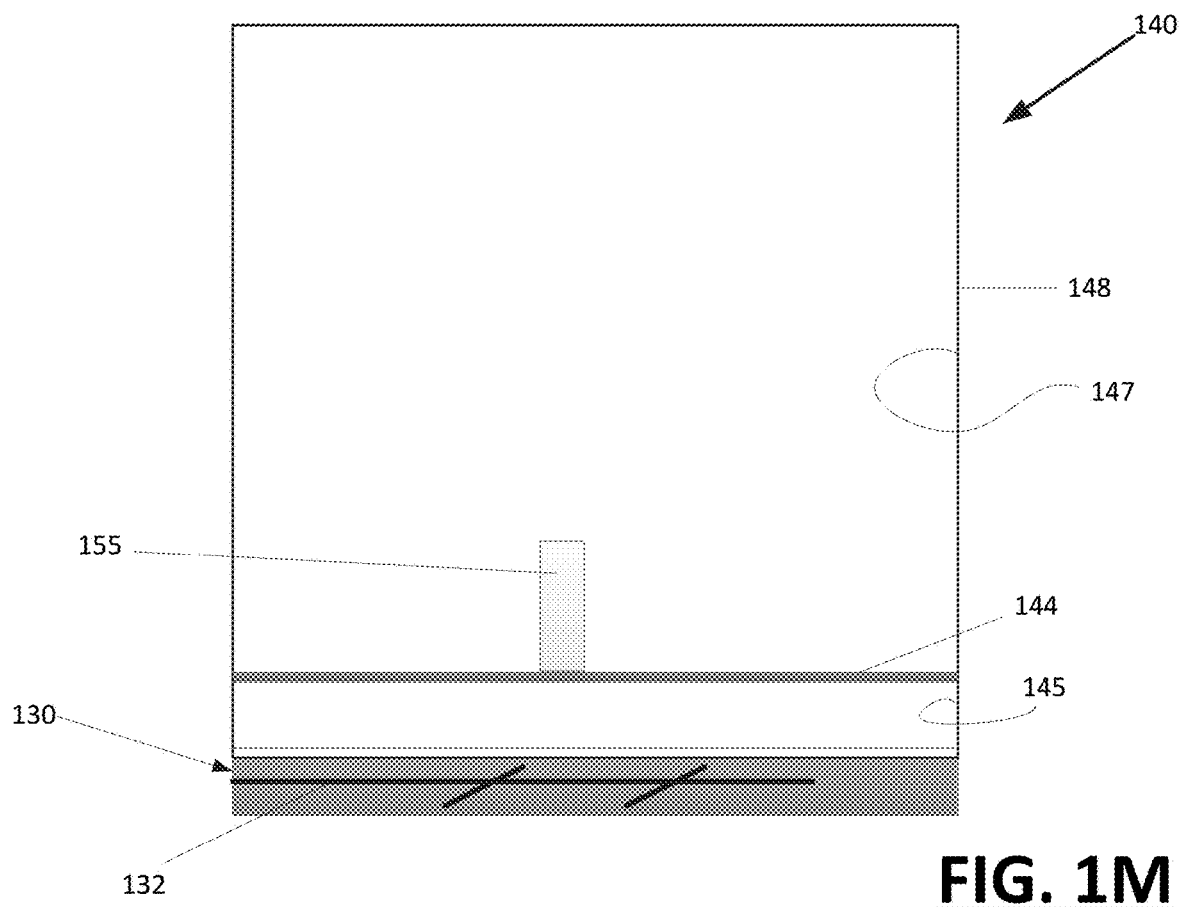
FIG. 1M illustrates a side view of receptacle without manipulator, according to an aspect.

FIG. 1M illustrates a side view of receptacle 140 without manipulator 138, according to an aspect. The receptacle 140 can include sidewalls 148 and the bottom cooking surface 144, which rests on bottom segment 130 and heater 132. Various features environments through the receptacle. For example, in one implementation, the receptacle 140 includes a steamer, having a reservoir 146 that heats and steams a cooking chamber 151. The sidewalls 148 can extend partially or completely to the top segment 114. The interior of the receptacle 140 can be segmented to include one or more barriers 155. The barrier 155 can be partial and separate cooking surfaces on the bottom of the receptacle. Alternatively, the barrier 155 can separate the interior of the receptacle 140 so as to provide different cooking environments (e.g., steamer and skillet). In some variations, the base 112 and/or receptacle 140 can include a lid (not shown) to enable pressurized cooking.

Figure 1N:
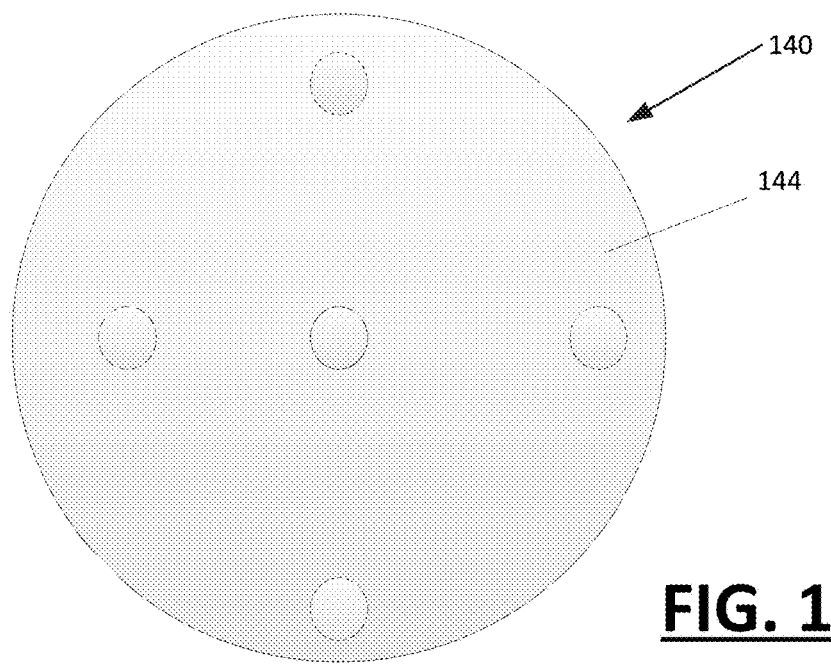
FIG. 1N illustrates a heating surface of the receptacle, according to an embodiment.

FIG. 1N illustrates heating surface 144 of the receptacle 140, according to an embodiment. In particular, FIG. 1K illustrates an area of coverage for manipulator 138, when operating within receptacle 140. As shown, the end segment 133 can operate to cover a substantial portion of the area of the receptacle 140. Among other benefits, the manipulator 138 can provide a thorough mixing, stirring, cutting, slicing, basting, or swirling motion (as determined by setting or selection) that engages food item in both center and corner regions of the receptacle 140.

In a variation, the heating surface 144 can be segmented to provide barriers for the preparation of combined food items. For example, some dishes can incorporate two items which require different cooking temperature or manipulation processes. Furthermore, the barriers can maintain separation of the food items as part of the preparation process. For example, raw meat can be separated from other foods that are being cooked at low temperatures.

With reference to examples above, the structure of the receptacle 140 can vary depending on design and implementation. The receptacle 140 can be provided with additional sidewall structures to enclose the container during the cooking process (e.g., prevent spillage when the food manipulator 138 operates). Still further, in some variations, a lid can optionally be provided to enable pressurized cooking.

Still further, in some variations, the heater 132 can be replaced with a cooler or chiller. For example, the bottom plate 130 can be replaced by a component that cools the temperature rather than heats the temperature. Still further, the receptacle itself can include additional structures that enable refrigeration or cooling.

Additionally, while some examples provide for the extraction mechanism to utilize air (or other gas/liquids) in combination with a vacuum draw, variations can add or substitute expansive containers that are sealed in a vacuum and use the expansion effect of the vacuumed seal being eliminated to expel the food items. With reference to FIG. 1O, the food extraction mechanism 180 includes a puncture 199 that pierces a seal 197 of a container 111. The conduit 170 can provide a puff or burst of air (or other gas/liquid) to cause or facilitate extraction of the food item.

In an example of FIG. 1O, the container 111 may resemble the container 10 shown in other examples, except the structure of the housing can be malleable, so as to be expansive when air/liquid is injected into the sealed container that is under vacuum. Other variations can provide a mechanical element to extend into the container and extract food when the container 111 is expanded from the vacuum state.

Hardware Description

Figure 2:
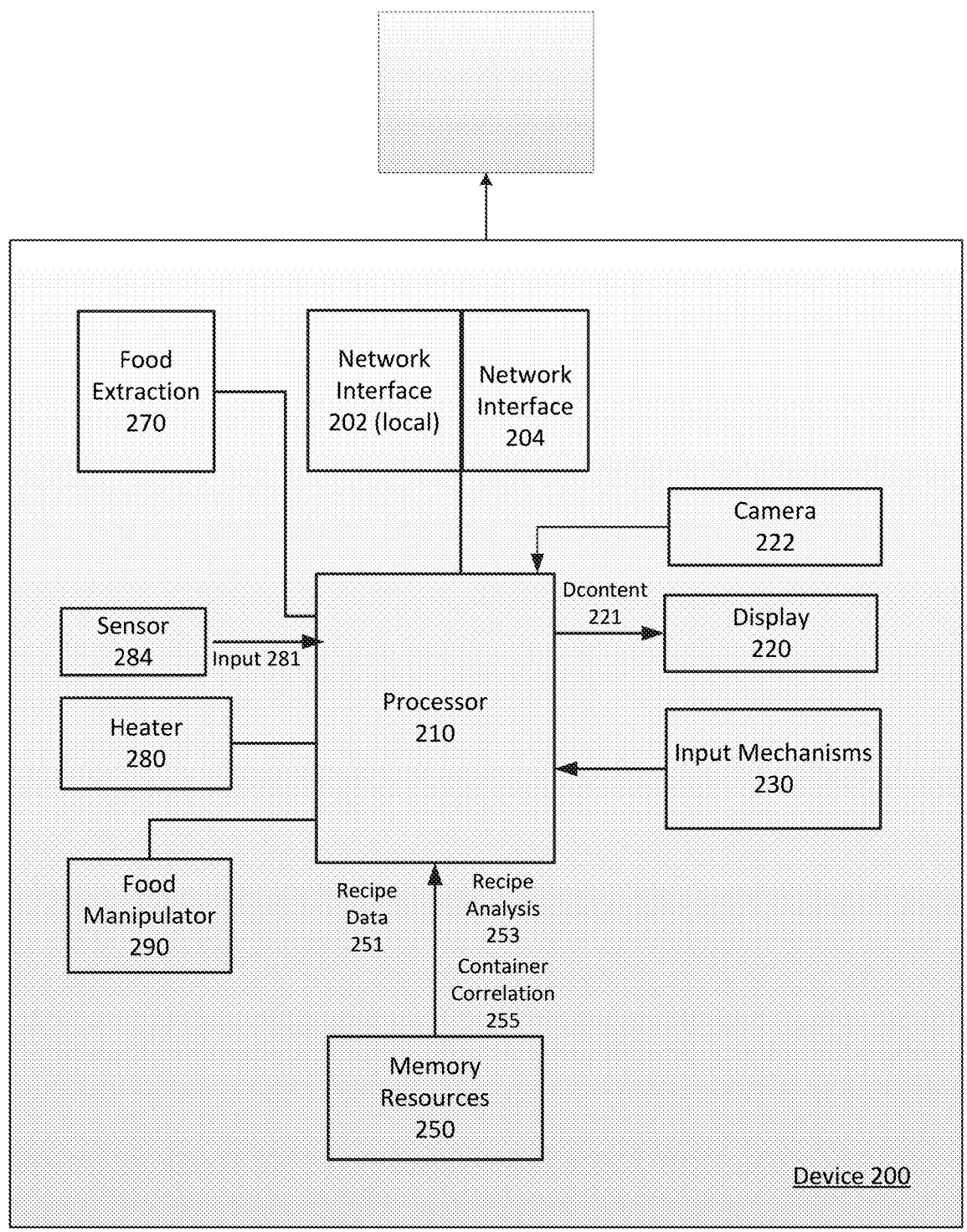
FIG. 2 illustrates a hardware diagram of a food preparation device, according to one or more embodiments.

FIG. 2 illustrates a hardware diagram of a food preparation device, according to one or more embodiments. In particular, a food preparation device 200 can optionally be implemented using, for example, structures and features such as shown with examples of FIG. 1A through FIG. 1B, and variations provided with FIG. 1C-FIG. 1E or FIG. 1F-FIG. 1G. With reference to FIG. 2, the food preparation device 200 includes a processor 210, a display 220, a set of input mechanisms 230, one or more wireless interfaces 202 (local), 204 (network), and memory resources 250. Additionally, the device 200 can include a food extraction mechanism 270, a heater 280, and a manipulator 290. In some variations, the device 200 includes a camera 222, such as a webcam, which communicates with the processor 210. As described below, the camera 222 can enable telecooking functionality, and or communicate images of the state of the food preparation device 100 to a remote user.

The display 220 can be implemented as, for example, a liquid crystal display ("LCD"), touch screen on the food preparation device 200. The processor 210 can communicate with the display 220 in order to provide feedback to the user, as well as to prompt the user for input. The feedback can include, for example, information that specifies what the processor 210 understands the user input to be, and/or specific information about the state of the device or its functions. Among other aspects, the processor 210 can output display content 221 through the display 220. By way of example, the display content 221 can identify what food item is being prepared, and/or a state of the food item including, for example, an amount of time remaining for the food item to be cooked, or steps that are yet to be performed before the food item can be prepared. In variations, the display output of the processor 210 can be communicated to another computer, such as a user tablet or laptop, via one of the network interfaces 202, 204.

The input mechanisms 230 can include, for example, a button, button set, or a touch screen or touch surface functionality. Additionally, various alternative forms of input mechanisms can be included with implementations described herein, including input mechanisms that provide a keyboard, voice input, or form of tactile/manual input (e.g. provide for more or less salt, how well-done meat should be).

The processor 210 can communicate with a network site or service using one or more wireless communication interfaces 202, 204. For example, the wireless communication interface 202, 204 can enable communications under one or more of 802.11(s), 802.11(b), 802.11(g) or 802.11(n) (collectively "Wi-Fi"), or through cellular transmissions. As an addition or alternative, the wireless communication interface 202 can enable a local wireless link, such as through a Bluetooth protocol to other devices (e.g., mobile devices operated by a user).

In operation, the processor 210 can control operation of components that comprise or correspond to the food extraction mechanism 270, the heater 280, and/or the manipulator 290. In particular, the processor 210 can select the particular extraction component used to extract the food item from the food container 10. For example, with reference to FIG. 1D, the processor 210 can select whether the vacuum pump 166 is used to draw the food item out of the container 10, whether the injector 165 is used to push the food item out, or whether a combination of the vacuum or injector are used. Still further, the processor 210 can control an amount of food that is extracted from the container 10. The type of extraction used can be selected based on, for example, the contents of the food container 10 being extracted.

The heater 280 can be implemented as part of, for example, bottom plate 130. In one implementation, the heater 280 can be provided as an inductive or electrical heating surface that can heat the receptacle 140 to a suitable temperature to cook food such as meats or vegetables (e.g., 250-450 F). The processor 210 can control the temperature and duration in which the heater 280 is provided. In a variation, the processor 210 can control multiple heaters independently, so as to create different temperature environments within the receptacle. As feedback, the processor 210 can receive temperature input 281 from sensors 284 provided within the receptacle 140 (FIG. 1A-1B and FIG. 1C). In this way, the temperature sensors can provide feedback to the processor 210, and the processor 210 can use the feedback to regulate the heater 280.

The processor 210 can also control the manipulator 290. In some embodiments, the manipulator 290 can be implemented using the manipulator 138, manipulator motor 169 and connection mechanism 177, such as shown by an example of FIG. 1G. The control parameters that can be used for the manipulator 290 include one or more of (i) type of mixing (e.g., stirring, heavy mixing, swirling), (ii) degree of mixing (e.g., quick, slow, strong etc.), (iii) duration of mixing, (iv) time pattern for mixing (e.g., stir and pause, repeat), and/or (v) end segment 133 that is used during each time interval.

In controlling the food extraction mechanism 270, the heater 280 and/or the manipulator 290, the processor 210 can receive input from one or more of multiple sources. For example, the processor 210 can download a recipe from a network site using the network interface 202, receive the recipe from the user using the wireless device interface 204 (e.g., user uses mobile device and local network to wirelessly transmits the recipe to the food preparation device 200), or to an associated user device (e.g., laptop, via one of the interfaces). As described with examples of FIG. 3 through FIG. 6, the input can correspond to recipe input. The processor 210 can parse or otherwise analyze the recipe in order to determine information, including (i) which containers 10 of food items are needed to implement the recipe, (ii) specific times after commencement when each container 10 is added, (iii) temperature settings of the receptacle, which can be used to control the heater 280, and/or (iv) mixing settings, which can be used to control the manipulator 290.

The processor 210 can store recipes in the memory resources 250. Additionally, the memory resources 250 can store instructions and data ("recipe data 251") for correlating recipe information to parameters for using and controlling the device 200. In an embodiment, the memory resources 250 can store instructions for parsing recipes for food items and/or settings (e.g., temperature settings) ("recipe analysis 253"), and/or for correlating food items (e.g., butter, olive oil, chicken breast, rice etc.) to food containers 10 that supply specified food items or their equivalents ("container correlation 255"). By way of example, the memory resources 250 can store data that correlates "cut chicken breast" to a container that includes "chopped chicken," or "butter" to "olive oil". The processor 210 can use the data stored in the memory to identify what food containers 10 are needed for a particular recipe, and further to determine the settings of the heater 280 and/or manipulator 290 based on the specifications of the recipe.

According to some examples, the processor 210 of the food preparation device 200 can also implement a calibration routine or mechanism to ensure that the arm can contact all (or required) surfaces of the receptacle. In one implementation, the routine or mechanism may use a colored liquid or material that the arm must remove by contacting the surface. The colored liquid may cover the pan, while the arm moves over the pan in a preprogrammed motion. A color perceptive sensor (e.g., sensor 119) can be used to track where the arm has been by looking at the colored liquid coverage after a motion. The sensor output can be provided back to the processor to dynamically adjust the motion of the arm. The calibration may be stored as a set of parameters that can be utilized on future runs of the machine. The calibration may be user initiated, initiated by an event (e.g. first run), initiated before shipment to customer, initiated by a malfunction or series of malfunctions, or initiated by other mechanism that can determine that the arm needs calibration. A calibration process such as described can be configurable to use different colored liquids, or liquids with different properties (e.g. shiny or matte) that differentiate contacted and uncontacted surfaces.

Programmatic Architecture

Figure 3:
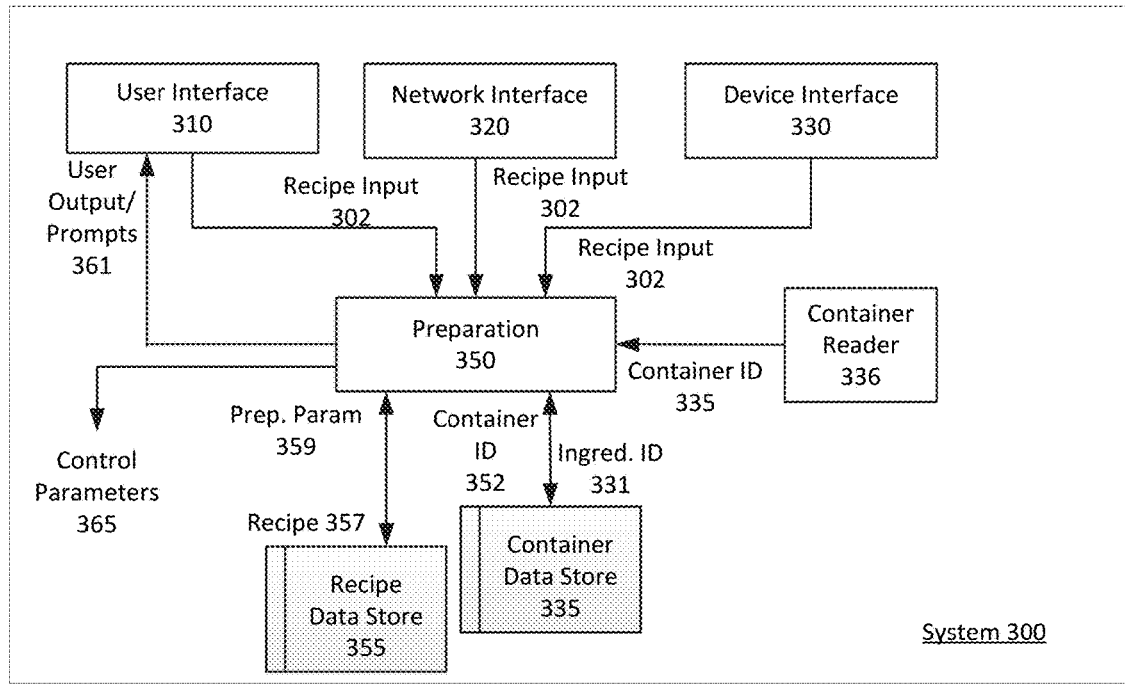
FIG. 3 illustrates a system for controlling and utilizing a food preparation system in conjunction with recipes of desired food items, according to one or more embodiments.

FIG. 3 illustrates a system for controlling and utilizing a food preparation system in conjunction with recipes of desired food items, according to one or more embodiments. A system 300 such as described with FIG. 3 can be implemented using a hardware system such as provided with an example of FIG. 2. Furthermore, system 300 can be implemented on the food preparation device such as shown and described with examples of FIG. 1A through FIG. 1I.

In more detail, system 300 includes a user interface 310, a network interface 320, one or more device interfaces 330 and a preparation module 350. The user interface 310 can include functional components that enable the user to provide input through the display 220 and/or input mechanisms 230. Alternatively, the user interface 210 can be generated and outputted by the processor 210 to an associated display device connected via, for example, a particular network interface 202, 204. In some implementations, the user interface 310 can include functionality in which the user is prompted to enter information, including recipe input 302, through for example, the display 220 (FIG. 2). The preparation module 350 can receive recipe input 302 from either of the user interface 310 (e.g., the user can manually enter a recipe), network interface 320 (e.g., system 300 can be triggered to download a recipe from a network site or service) and/or the device interface 330 (e.g., system 300 can communicate with the user device to receive some or all of the recipe).

Still further, preparation module 350 can have access to a recipe collection that is locally stored, such as for example, on the memory resources 250 (see FIG. 2). In such an implementation, the recipe input 302 can correspond to the user entering, through the user interface 310, a selection of a pre-stored recipe. Still further, the recipe input 302 can include input that the user enters to alter an existing recipe (e.g., a recipe that is pre-stored, or a recipe deadest downloaded from a network site). For example, the recipe input 302 can include the substitution or replacement of the recipe item (e.g., olive oil from butter).

The preparation module 350 can include logic to parse a recipe (as provided or specified with recipe input 302) for ingredients. The preparation module 350 can cross-reference a list of ingredients, including identifiers 331 for specific ingredients, with food containers 10 that include the same ingredients or their equivalents. In one embodiment, the preparation module 350 uses a container data store 335 in referencing the ingredient identifier 331 for a food container identifier 352.

Additionally, the preparation module 350 can determine, for a given recipe 357, preparation parameters 359 that are recommended or needed by the recipe 357. The preparation parameters can further be determined in the context of determined food containers 10. For example, recipe items may be referenced against predetermined preparation parameters for such items, and the preparation parameters can be provided in the context of the food containers 10. Thus, while the recipe may call for raw chicken to cook at 350° F., the recipe data store 355 can specify that to cook raw chicken, a corresponding raw chicken food container needs to be heated at 370° for a specified duration. Likewise, while the recipe may call for a cooked chicken, the identified food container 10 may correspond to a partially cooked chicken, or alternatively to a fully cooked chicken that is to be warmed. In such an instance, the recipe data store 355 can identify alternative cooking parameters 359 (temperature, heating) for the particular food container 10 (e.g., one with cooked chicken) that is to substitute for the recipe item. Furthermore, the recipe data store 355 can specify a sequence in which the food item of the identified food containers 10 are introduced into the cooking receptacle (e.g., see receptacle 140) of the food preparation device.

The preparation module 350 can also determine the sequence or order in which food containers 10 are introduced into the receptacle 140 (see FIG. 1A and FIG. 1B). For example, with reference to the food preparation device 100 of FIG. 1A and FIG. 1B, the opening of the base 112 (whether provided in top-down orientation, bottom-up orientation or other) can receive food containers 10 determined for a particular recipe in a particular order that dictates the sequence in which the food item of that container 10 is introduced into the receptacle 140. The preparation module 350 can communicate the sequencing or order of the individual food containers 10 to a user who places the food containers 10 in the opening 115. For example, the user interface 310 can be used to display an order for the placement of food containers 10 into the opening 115 of the housing 110. In some variations, the order or sequencing of the food items can also be altered from that specified by the recipe based on the variations provided by the determined food containers 10 for those food items. By way of example, if the recipe specifies for raw chicken that is introduced early into the food preparation process, the recipe data store 355 can specify that a food container 10 containing fully cooked chicken (as a determined substitute) is to be introduced into the cooking receptacle after all of the other food items of the recipe.

The preparation module 350 can include logic to verify that the user has properly inserted food containers 10 for a given recipe. The verification can include determining that the user has inserted containers 10 in the correct order. For example, in one implementation, logic corresponding to container reader 336 can be utilized with a camera or optical recognition component to read machine code or other identifier as provided on individual food containers 10 that are to be used for the given recipe. In a variation, the system 300 includes an RFID detector that detects and identifies an identifier/code of each food container 10. In still another variation, the preparation module 350 can have the user manually specify identifiers for individual food containers 10 of the recipe as a user places the containers 10 into the opening 115 of the housing 110. The preparation module 350 can verify, or check that the proper food containers 10 are being inserted into the opening 115 of the housing 110. Additionally, the preparation module 350 can verify that the ordering of the food containers 10 is correct given the requirements of the recipe and/or the food containers 10 being utilized.

The preparation module 350 can generate output for the user interface 310. In one embodiment, the output 361 can specify what food containers 10 the user will need in order to implement a specific recipe. The output 361 can also specify the order or sequence of the food containers 10, so as to prompt the user to position the food containers 10 in the correct order within the opening 115 of the base 112.

The preparation module 350 can also generate control parameters 365 for the use of the components needed to cook the food in the containers 10. Specific examples of control parameters include the temperature that the heater 280 is to rise to, as well as a duration for which that temperature is to be maintained. Examples contemplate that one recipe can utilize multiple temperatures, so that the cooking temperature (as maintained in the receptacle 140) may fluctuate by intent during the cooking process, and further different durations of heating may apply for different temperatures. As such, control parameters 365 can specify temperature, timing, and other parameters, such as the need for water or other liquids. The control parameters can be specific to components that include food extraction mechanism 270 (see FIG. 2), the heater 280 (see FIG. 2) and/or the manipulator 290 (see FIG. 2). The control parameters 365 (e.g., temperature, duration of heating) can also be determined from the rest of the recipe 357, such as provided by the recipe data store 355.

Figure 4:
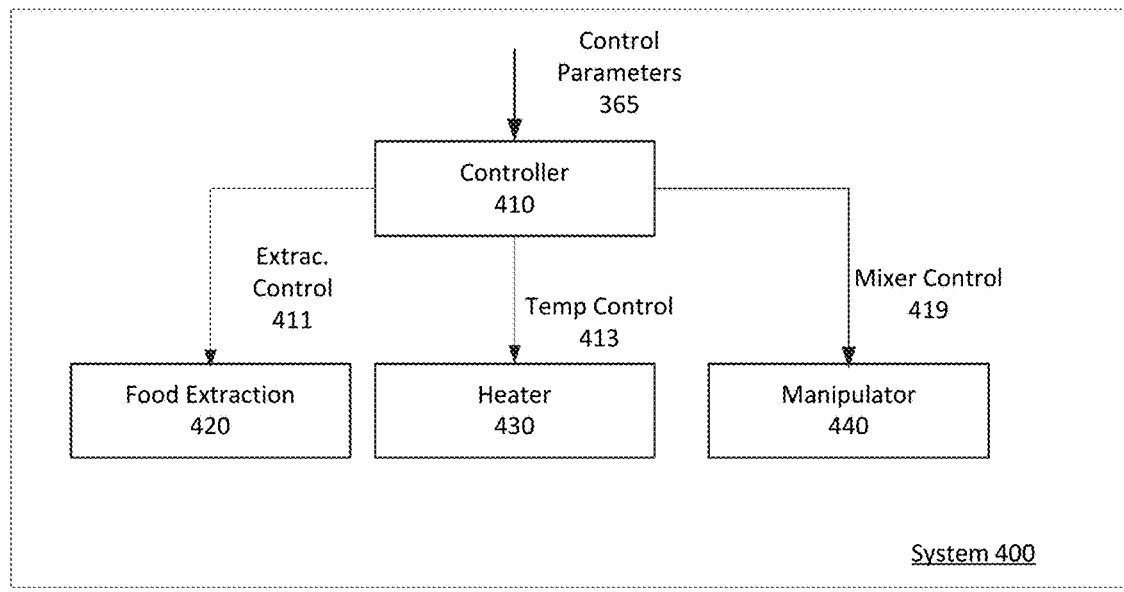
FIG. 4 illustrates a control system for a food preparation device, according to one or more embodiments.

FIG. 4 illustrates a control system for food preparation device, according to one or more embodiments. A system 400 such as described with an example of FIG. 4 can be implemented using a hardware system such as provided with FIG. 2. Furthermore, system 400 can be implemented on the food preparation device such as shown and described with FIG. 1A and FIG. 1B.

With reference to FIG. 4, a controller 410 can be implemented on the processor 210 in there is a controlled components that correspond to one or more of (i) food extraction mechanism 270 (see FIG. 2), (ii) heater 280 (see FIG. 2), and/or (iii) manipulator 290 (see FIG. 2). The system 400 can include logic for each of food extraction 420, heater 430, and manipulator 440. The food extraction logic 420 can include, for example, firmware, integrated circuits and/or programming (e.g. provided on the processor 210) to control operations of components that perform extraction (e.g., injector 165, vacuum pump 166 of FIG. 1). In an example provided by FIG. 4, control parameters 365 can be provided to the controller 410 from, for example, the preparation module 350. The control parameters 365 can specify parameters for extracting, heating and/or food items of the food container 10.

The controller 410 can signal extraction control 411 for the food extraction logic 420, which in turn controls the mechanical output of the food extraction mechanism 270 (e.g., injector 165, vacuum pump 166 of FIG. 1). The extraction control 411 can select which extraction mechanism is used (e.g. vacuum, injection, or tilting food container 10 at a specific angle). In variations, the extraction control 411 can also specify the magnitude of the extraction (e.g., extra vacuum for solid food), or other parameters (e.g., heat injection liquid).

As still another variation, the extraction control 411 can specify an amount of food item to be extracted. The determination of the amount that is to be extracted can be based on, for example, the recipe. For example, the food container 10 can retain two ounces of chopped tomatoes, and the recipe in use may call for one ounce of chopped tomatoes to be used. The extraction control 411 can specify that half of the food items are to be extracted. The user can then refrigerate or maintain the other half of the food container 10 for subsequent use.

The heater logic 430 can include, for example, firmware, integrated circuits and/or software (e.g., which can be provided on the processor 210) to control the operations of the heater 280. In an example described with FIG. 1A through FIG. 1H, the heater 280 can be implemented through the bottom plate 130, which engages and heats the receptacle 140. The controller 410 can signal temperature control 413 to the heater logic 430. In response to receiving temperature control 413, the heater logic 430 can manage the output of the heater 280. For example, in an implementation in which the heater 280 is an electrical heater, the heater logic 430 can increase/decrease current through a resistive element in order to increase or decrease the temperature of the heater 280. Additionally, the temperature control 413 can distinguish between different heating elements of the heater 280, so as to create different temperature environments.

Likewise, the manipulator control logic 440 include, for example, firmware, integrated circuits and/or software (e.g., which can be provided on the processor 210) to control the operations of the manipulator 290. In an example described with FIG. 1A and FIG. 1B, the manipulator 290 can be implemented by a member that extends from the top segment into the receptacle 140. The controller 410 can signal the manipulator control logic 440, a manipulator control 419 that specifies one or more of (i) type of mixing (e.g., stirring, heavy mixing, swirling), (ii) degree of mixing (e.g., quick, slow, strong etc.), (iii) duration of mixing, and/or (iv) time pattern for mixing (e.g., stir and pause, repeat).

While embodiments such as recited with FIG. 3 or FIG. 4 are recited in the context of a device such as shown with examples of FIG. 1A through FIG. 1L, in variations, other cooking systems or devices can be implemented. For example, a distributed system can be implemented with a conventional stove top. In such a system, a computer-implemented controller can operate on a motorized manipulator that is moved about a track on a stove top (or oven). A manipulator can be mounted above or to the side of a cooking surface (e.g., stove-top), and the manipulator can be controlled to change the manipulator's position using a motor controlled by the controller. In this way, the manipulator can lock into place above one burner, then move into place over another burner and maintain multiple cooking receptacles at one time. A user can upload recipes to the controller, which can operate similar to programming or logic described with examples of FIG. 3 or FIG. 4. The controller can in turn process the recipe and determine actions or movements for the manipulator. The controller can also provide information prompts or messages to a user in order to guide the user into preparing the meal. The controller can, for example, move between cooking surfaces and burners, using time intervals that are determined by the recipe. Actions such as stirring or blending can be programmatically implemented and repeated as needed. Still other actions such as waiting for cooling, or stirring until a certain consistency is reached, can also be performed. The combination of the controller, track system, and motorized manipulator can in this way provide a guided and assisted meal preparation experience for the user.

Methodology

Figure 5:
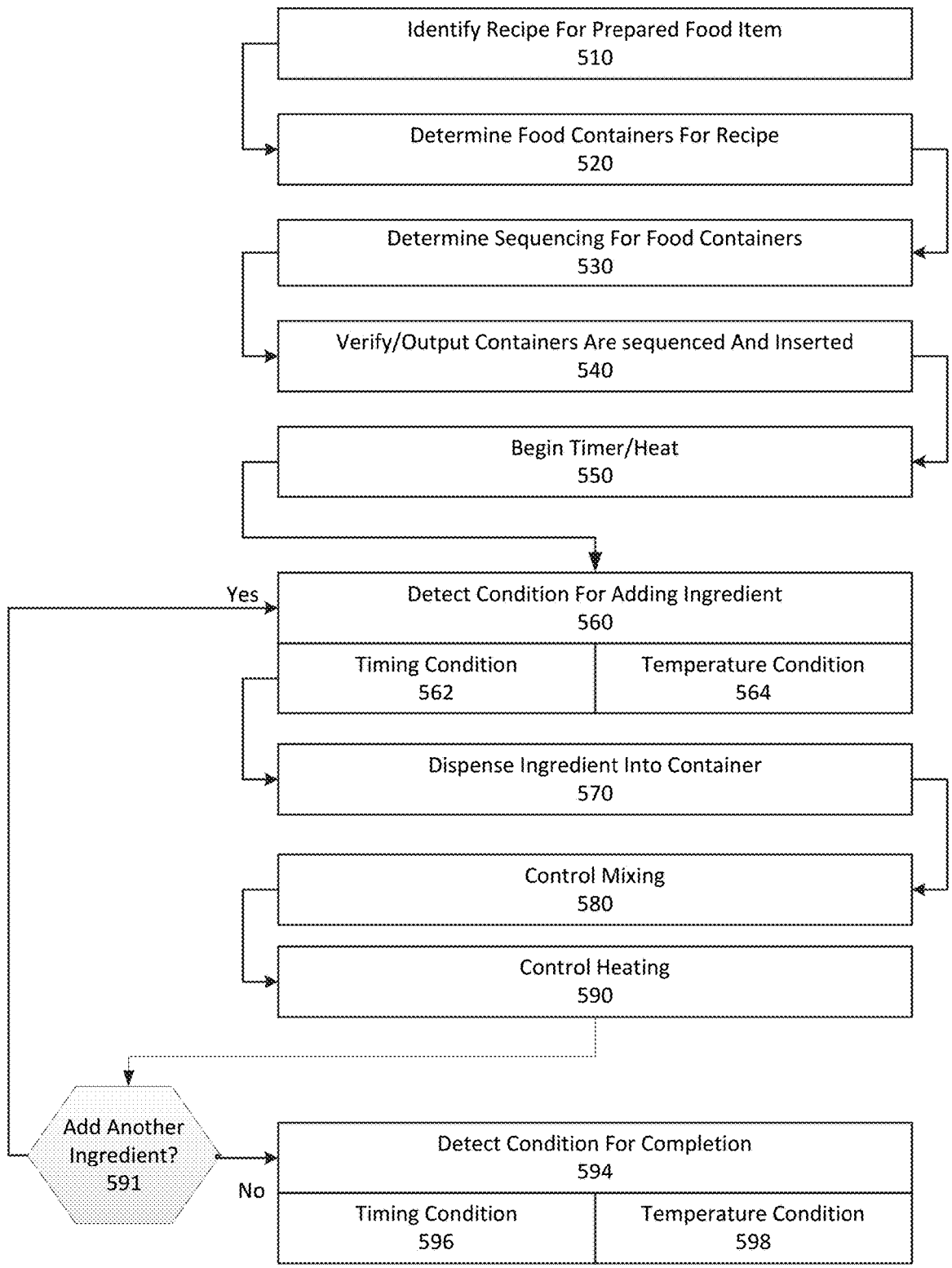
FIG. 5 illustrates a method for operating a food preparation device, according to one or more embodiments.

FIG. 5 illustrates a method for operating a food preparation device, according to one or more embodiments. In describing an example of FIG. 5, reference may be made to other examples, such as elements described with FIG. 2. Reference is made to elements of other examples for purpose of illustrating suitable elements or components for performing a step or sub-step being described.

With reference to FIG. 5, the food preparation device 200 identifies a recipe for a food item that is to be prepared (510). In one implementation, the device 200 utilizes the network interface 202 in order to access a network site and retrieve one or more recipes. For example, a user may control the device 200 and specify a network resource where a desired recipe is provided. Still further, the user can operate a separate computing device that can communicate with the food preparation device 200. The user can operate the computing device to signal a recipe to the food preparation device 200 via the wireless communication port 202. Still further, the user can specify a recipe stored in the memory resources 250 of the device, or provide recipe information 251 corresponding to a recipe or portion thereof through the input mechanisms 230.

The processor 210 can determine a set of food containers 10 that include food items specified in the recipe (520). For example, with reference to FIG. 2 and FIG. 3, the processor 210 can implement a preparation module 350 which parses recipes for food items, and correlates the food items to food containers based on a correlative data store (e.g., container data store 335 of FIG. 3).

In addition to determining food containers 10, the processor 210 can determine a sequencing or order for the food containers 10 (530). The sequence or order can determine the order in which the food containers 10 are placed in the housing 110 of the food preparation device. For example, with reference to FIG. 1C and FIG. 1D, the order or sequencing can determine the order in which food containers 10 are placed in the opening 115 of the housing 110.

In some embodiments, the device 200 includes resources for verifying the placement of food containers 10 within the opening 115 of the housing 110 (540). Additionally, the resources can verify the order or sequence of containers 10 provided in the housing 110. In one implementation, the device 200 can include a machine reader that detects a code on each food container 10. With further reference food preparation device 100, machine reader can verify the inclusion, and optionally the ordering of the food containers 10 in the opening 115 of the housing.

Once food containers 10 are provided within the device 200, the device 200 can begin food preparation (550). According to some embodiments, the device 200 starts the heater 280. The processor 210 can also initiate a timer for the heater. In some variations, the processor 210 can trigger the food extraction mechanism to extract food items from the food container and to disperse the food items into the receptacle 140 (see FIG. 1A through FIG. 1D).

Once cooking is initiated, the processor 210 performs steps to introduce food items into the receptacle 140. In particular, the processor 210 initiates operations to detect a condition for adding a food item into the receptacle 140 (560). The condition can include timing parameters (562). By way of example, the timing parameter can include a duration after heating occurs at a particular temperature, or alternatively, a sequencing condition (e.g., was another food item introduced into the receptacle as a pre-condition). As an alternative or variation, the condition can include a temperature condition (564). The temperature condition can identify whether the receptacle or heater 132 is at a pre-determined temperature before the food item is introduced (e.g., heat receptacle 140 to 335 F before introducing raw chicken).

Once the condition for adding a food item into the receptacle 140 is met, the processor 210 can trigger the food item to be extracted from the corresponding food container 10 and dispensed into the receptacle 140 (570).

Following dispensing of one or more food items, the processor 210 can control the manipulator 290 into mixing the receptacle of the food preparation device (580). The manipulating can specify a type of manipulating, a duration of manipulating, a range of manipulating and/or a timing pattern for the manipulating. After introduction of another ingredient, an embodiment provides that further manipulating (e.g., stirring) can be performed, based on control parameters etc. For example, a second ingredient (or second set of ingredients) can be provided by a food container 10 that is ordered to follow a first food container 10 that includes the first food item introduced in the receptacle 140. The condition for introducing the second food container 10 can include (i) a timing parameter, corresponding to the pre-condition that the first food container 10 is dispensed; (ii) a heating/cooling condition, corresponding to the temperature of the receptacle 140 being raised to a particular temperature; and (iii) a timing parameter, corresponding to a duration of time during which the receptacle (140) (and food item from first container 10) is heated to the particular temperature.

Additionally, following dispensing of the food items, the heater 280 can be controlled by the processor 210 to achieve a particular temperature for cooking/warming contents of the receptacle 140 (590). In some implementations, the processor 210 can control the heater 280 into raising or lowering the temperature of the receptacle after introduction of a particular food item, or after passage of time. Thus, for example, the cooking process can include using multiple temperatures, which adjust or change after introduction of food items and/or passage of time.

A determination can be made as to whether additional ingredients are to be introduced (591). In one implementation, the determination can be made after each instance in which a food item is introduced into the receptacle 140. If another food item is to be extracted and introduced into the receptacle 140, then the method repeats at (560). Else the processor 210 detects a condition for completion of the cooking process (594). The condition for completion of the cooking process can include a timing condition (596). For example, the cooking process continues for ten minutes after the last ingredient is introduced. The condition for completion of the cooking process can alternatively include a temperature condition (598). For example, the cooking process can end when the temperature of an item is deemed to reach a certain level.

Figure 6:
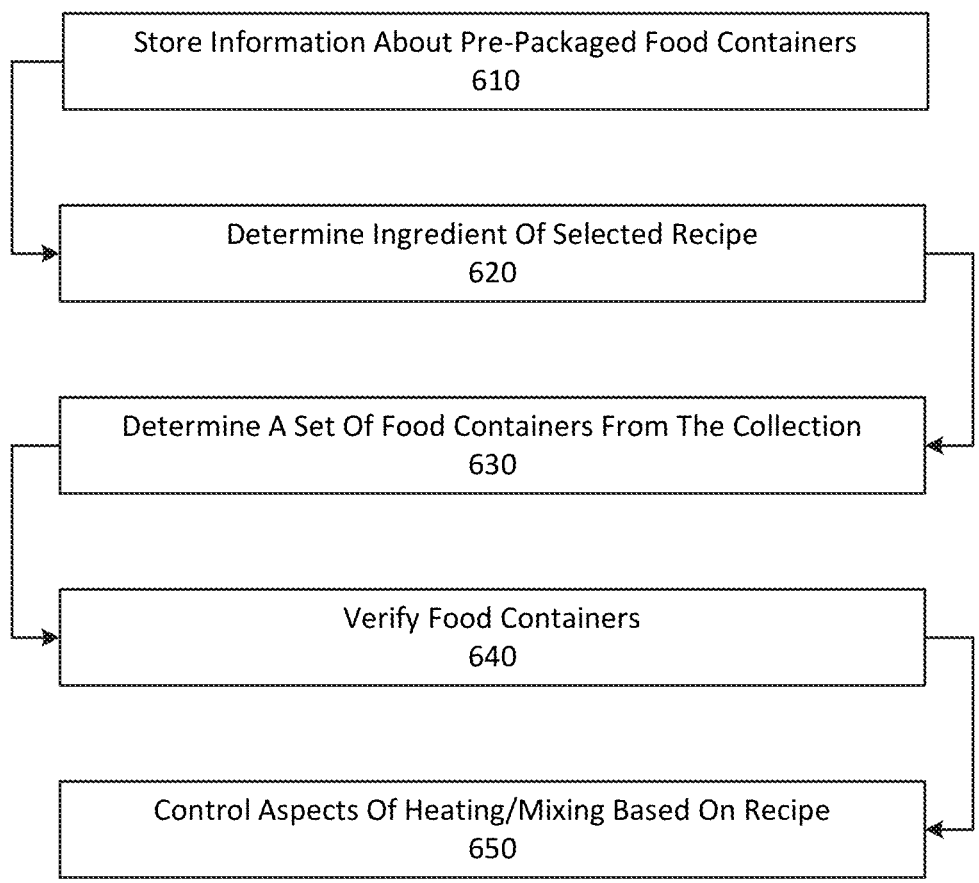
FIG. 6 illustrates a method for utilizing a food preparation device and pre-packaged food containers to implement a recipe, according to one or more embodiments.

FIG. 6 illustrates a method for utilizing a food preparation device and pre-packaged food containers to implement a recipe, according to one or more embodiments. A method such as describe with an example of FIG. 6 can be implemented using a device such as described with FIG. 2, and further a system such as described with FIG. 3. Accordingly, reference may be made to elements of FIG. 2 and FIG. 3 for purpose of illustrating suitable components or elements for performing a step or sub-step being described.

In an embodiment, information about a collection of pre-packaged food containers 10 is stored with memory resources 250 of the food preparation device (610). Alternatively, the information can be stored remotely and provided as, for example, a service in conjunction with use of a food preparation device. The information about the collection of pre-packaged containers 10 can include information about individual food items contained in each container 10 of the plurality of pre-packaged containers 10.

The ingredients of a selected recipe can be determined (620). In one implementation, the processor 210 implements logic (e.g., using instructions stored in memory resources 250) to determine the ingredients of a particular recipe. In a variation, the logic can be provided remotely to the food preparation device 200, and the results determined from implementing the logic can be communicated to the food preparation device 200.

In an embodiment, the processor 210 determines a set of containers 10 from the collection of pre-packaged containers (630). The set of containers 10 are selected as for providing the ingredients for a prepared food item of the recipe. The set of food items can be determined based at least in part on comparing the food items of the set of containers 10 with ingredients specified in the recipe.

Still further, in an embodiment, the processor 210 can perform a verification to confirm that each container 10 in the set of containers 10 is received in a food preparation device (640). For example, the processor 210 can control a machine reader to detect a machine-readable code on the individual food containers 10 in the set of food containers 10. Alternatively, the processor 210 can prompt the user to enter or otherwise specify information confirming that each container 10 in the set has been provided with food preparation device 100.

Additionally, the processor 210 can control one or more aspects of heating or mixing the food items provided from the set of containers based on the recipe (650). For example, the processor 210 can determine the control parameters 365, which control heating, manipulating (and optionally food extraction).

Additional Usages

In one aspect, the combination of the camera 222, processor 210 and network interface 202, 204 can enable a remote food preparation use ("telecooking"). For example, a remotely located user can conduct live telecooking, during which the remotely located user controls the operation of the food preparation device 100. By way of example, the remotely located user can conduct live cooking sessions which stream directly to the local machine. A remote user can upload a recipe and also adjusts the recipe as is necessary or desired. The operation of the food preparation device 100 can optionally be triggered remotely. For example, a mother can telecook and proctor her college-aged child on how to cook stir-fried tomato and eggs. The remote user (e.g., mother) can proctor the local user (e.g., her child) during the cooking process using a laptop or tablet device. Functions such as timing, recipe selection, prompts regarding the addition of ingredients, and/or temperature settings can be provided from the remote user. The food preparation device 100 can also provide prompts, generated through recipe processing or remote user input, to instruct the local operator to perform certain actions.

Manipulator Variations

Figure 7:
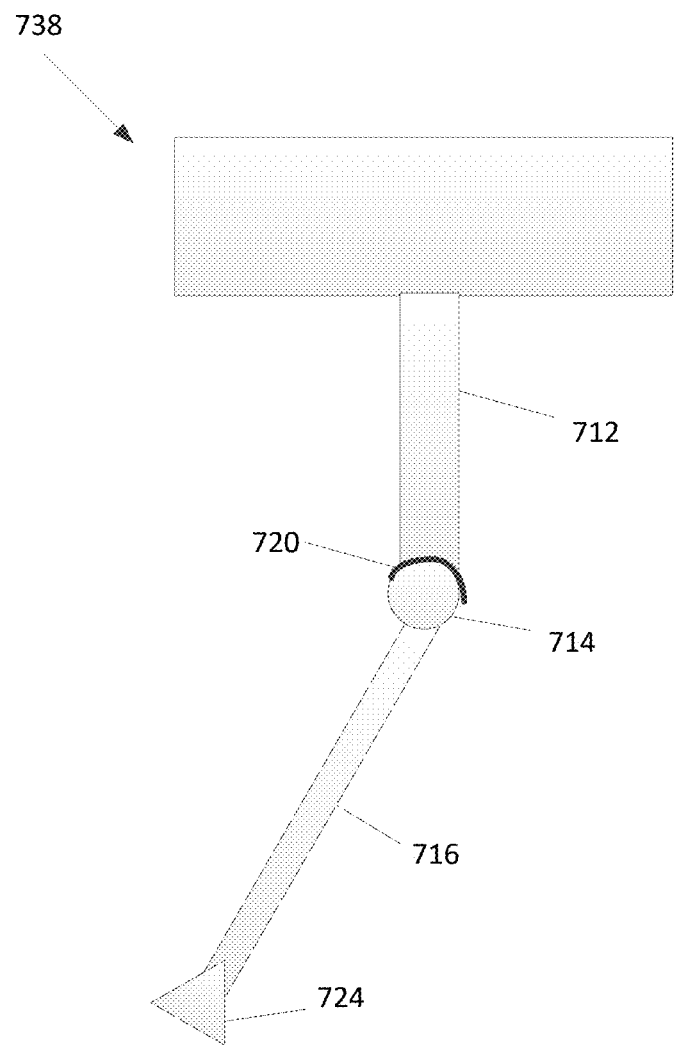
FIG. 7 illustrates a modular or augmented manipulator, according to one or more examples.

FIG. 7 illustrates a modular or augmented manipulator, according to one or more examples. A manipulator 738 can be implemented for a food preparation mechanism such as described with any of the examples provided above. In an example of FIG. 7, the manipulator 738 can also include multiple segments 712, 714, 716, including a base segment 712 and an end device 716. The manipulator 738 can be modularized, in that the individual segments 712, 714, 716 can be attachable, exchangeable and/or replaceable. One or more of the segments 712, 714, 716 can be connected or attached using the same or similar connectors as described with example(s) of FIG. 1J-1L. In one implementation, the manipulator 738 can include, as segments 712, 714, 716, a rigid lever, a servo or other motorized joint, an end effector or base connection. In some implementations, the manipulator 738 includes a removable water resistant or water proof casing. As an alternative or variation, the manipulator 738 can be provided with end components, accessory attachments or other segments which operate torches, gases, hot irons, liquids, dry foods, spices, and seasonings. Still further, the segments of the manipulator 738 can be shaped (e.g., modeled) to have shape/functionality of flippers, spatulas, tongs, grabbers, injectors, knives, scrapers, scissors, forks, or other common kitchen utensils, etc.

In some variations, the manipulator 738 can be configured to extend and retract as part of the manipulator's movement. Such a motion allows for the manipulator 738 to reach into corners while without forceful motion against the bottom of the cooking surface. To accomplish such an operation, the manipulator 738 can include a tension and spring sensor 720 that measures the amount of force being applied to the manipulator 738 from the surface, which can be used in a recipe to indicate hard or soft scraping, stirring, or other manipulation. The sensor 720 can be used to define a safety alarm or quality measurement that can be used in recipes, or when learning custom movements (i.e. learning how firmly or softly to scrape the receptacle). The sensor 720 can be provided at any point of manipulator 738, to detect forces on the vertical axis.

As another example, the manipulator 738 can include a probe thermometer 724 that can read the temperature of the food (either by stopping and pressing on the food or by submerging in the cooking liquid). The thermometer 724 can, for example, be implemented as a resistive temperature detector or other similar technology, utilizing an extension of the arm as a probe. In some variations, the temperature can be used as a mechanism for (i) establishing stopping criteria in a recipe step, or (ii) when defining quality measurements or quality alarms for the food preparation device 100/

Modularization

FIG. 8A-8C illustrate variations to a modularized food preparation device, according to some embodiments. With examples of FIG. 8A-8C, a food preparation device 800 can be constructed and operated in accordance with any of the examples described above. In FIG. 8A, the food preparation device 800 is shown to include a compartment 810 which can be provided within a housing 812 of the food preparation device 100. The housing 812 can include a tray structure and/or combination of trays to retain one or multiple food cartridges. In variations, the compartment 810 can alternatively serve other functions, such as serving as a cooling or warming chamber.

As shown with an example of FIG. 8B, the compartment 810 can be removed and replaced from the housing 812 in place of a different compartment 820. The compartments 810, 820 can vary by form factor (shape, size) and purpose. For example, the compartments can be provided for purpose of retaining trays of food cartridges, to provide cooling or refrigeration, to provide a warming chamber, or to maintain waste disposal. When the compartment is used for retaining food trays, one implementation provides that the compartments 810, 820 can be selected to match dimension, movement and type of food tray. In variations, the compartments 810, 820 can be open, with a corresponding tray engaged with the food preparation device 100.

In an example of FIG. 8C, multiple compartments 810, 820 can be packed against one another in a modular fashion. The compartments 810, 820 can service different purposes (e.g., food tray, cooling, heating, waste disposal, spice rack, etc.) or the same purpose. In some variations, the compartments 810, 810 can share or form a joined interior 832 which can house a single large tray, or multiple trays which can be interconnected by a conveyer or cartridge movement system.

Tray Assembly

A tray assembly includes a mechanism to retain trays (or food containers), to supply the trays to the food preparation device 100, and optionally to receive empty trays after the contents of the trays have been dispersed into the food preparation system 200. Numerous configurations and variations can be included with a tray assembly, as described with some examples provided below.

Figure 9A:
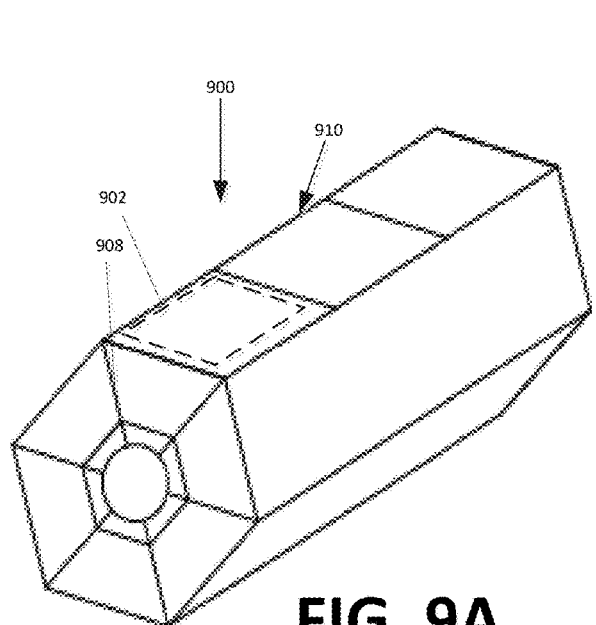
FIG. 9A and FIG. 9B illustrate alternative variations of a tray assembly, for use with one or more food preparation systems, such as described with other examples.
Figure 9B:
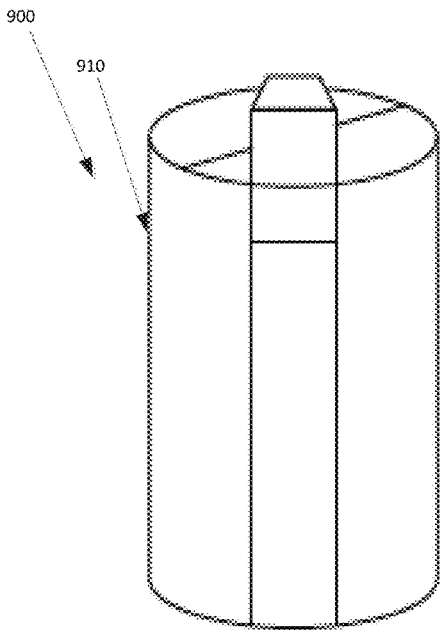

FIG. 9A and FIG. 9B illustrate alternative variations of a tray assembly, for use with one or more food preparation systems, such as described with other examples. FIG. 9A illustrates a tray assembly 900 comprising a cartridge 910 which retains trays 902 (shown in phantom) in a cylindrical orientation. The tray assembly 900 can include channels 908 to hold the trays with the cartridge 910. The cartridge 910 can rotate about a center carousel to line up individual trays for engagement and consumption by the food preparation system 200. The food preparation system 200 can, for example, receive and implement a recipe which specifies specific trays based on food contents.

The trays 902 can be loaded into the carousel cartridge 910 by the user in advance of using the food preparation system 200. The user can, for example, slide trays to slots defined by channels 908 of the carousel cartridge 910.

Numerous form factors and configurations can be implemented in order to retain trays for use by the food preparation system 200. In an example of FIG. 9A, the carousel cartridge 900 is shown in a horizontal configuration. The carousel cartridge 910 can include addressed slots 904. When implementing a recipe, the user can be guided or instructed to place trays 902 into specific slots based on the addressed positions. In an example of FIG. 9B, the carousel cartridge 910 is positioned vertically to receive trays 902 from a vertical direction.

In either configuration, the user can load the carousel cartridge 910. When the user opens a door of the carousel cartridge 910, the action can optionally generate an indicator light. The carousel cartridge 910 can be pulled out of the food preparation system 900. Each food tray 904 which the user intends to use for a given recipe can be pushed down into a desired position. Once all of the trays are positioned within the carousel cartridge 910, the carousel cartridge can be aligned so that a selected tray 902 can be received in a corresponding opening of the food preparation system 900. In one implementation, the alignment may rely on a tab on the carousel cartridge 910 to fit into a slot on the device, to ensure correct positioning and addressing of the carousel. The door of the carousel cartridge 910 can be closed, causing the indicator light change to change state, and further enabling/triggering operation of the food preparation system 900.

While examples of FIG. 9A and FIG. 9B illustrate that the cartridge 910 can include a carousel structure or configuration, additional variations may include features for stacking the trays 902 in a directional (e.g., vertical) alignment. Among other benefits, vertical stacking of trays can reduce the needed footprint for the compartment of the food preparation device 100, while enabling easier manual insertion of trays. Optionally, the stacking configuration can promote or facilitate waste collection from the individual trays.

Figure 9C:
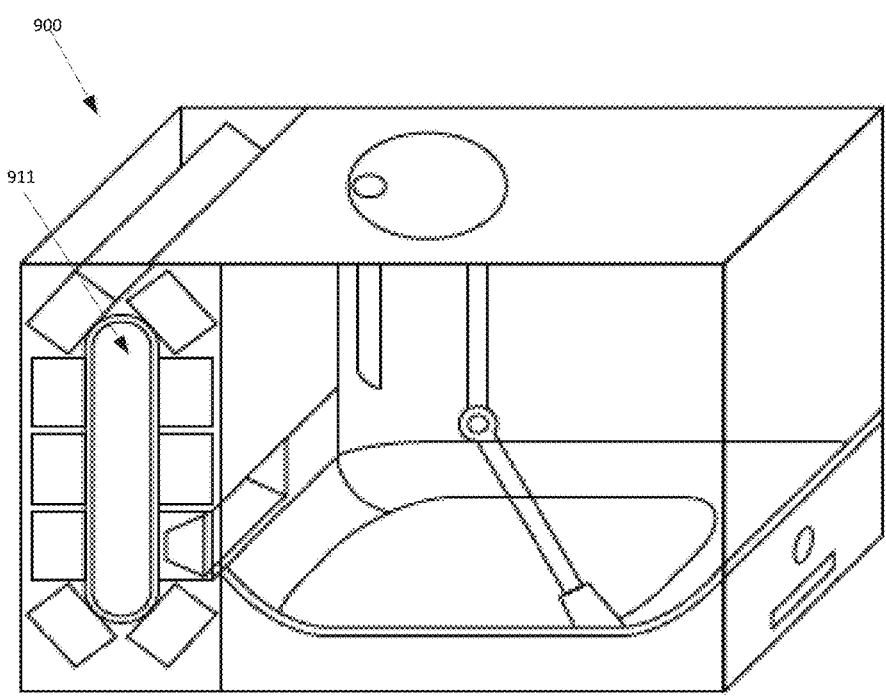
FIG. 9C illustrates a tray assembly with a stacked configuration placed in operation within a food preparation device, according to one or more examples.

FIG. 9C illustrates a tray assembly with a stacked configuration placed in operation within a food preparation device, according to one or more examples. In an example of FIG. 9C, the food preparation device 100 includes a tray assembly 900 having a center carousel 911 which moves or rotates the stacked trays so that the trays revolve around a vertical loop (similar to cars on a Ferris wheel at a carnival). The rotation of the trays 902 enable the individual trays to be positioned for engagement and consumption with the food preparation device 100. In an implementation of the tray assembly of FIG. 9C, the stacked trays are kept upright as they revolve around the vertical loop.

Trey Design and Considerations

FIG. 10A through FIG. 10F illustrate alternative tray designs, in accordance with various embodiments. As described with various examples, a tray 1000 is a specifically designed container to hold food for consumption by the food preparation device 100. Each tray 1000 can be specifically designed for the food preparation system 200, which can, as described elsewhere, vary in shape, modular design, size and function. Moreover, as described with examples of FIG. 9A through 9C, the trays can be stacked or arranged in multiples using a cartridge such as described with examples of FIG. 9A through FIG. 9C.

In variations, the trays 1000 can vary in dimension so as to be of different size. For example, each tray 1000 can be circular, rectangular, square, triangular, cylindrical, or other shape, and may contain at least one flat or curved edge that may be removed manually or automatically by the machine. In variations, a tray 1000 can have clips, holes, grooves, or magnets on the side or bottom to engage with a grabber 1120 (See FIG. 11) or another exterior attachment that can position the individual tray 1000 over the cooking receptacle. Additionally, trays 1000 may contain multiple compartments of different ingredients.

In alternative variations, individual trays 1000 can also contain extending edges near the top of the opening where the tray can be cut open to balance itself on at least 2 to barriers below the edge to keep itself level. Each tray 1000 can also be designed to be smaller at the bottom to fit on, for example, a platform of a cartridge, such as a tray wheel or vertical tray platform. The individual trays 1000 can be weighted at the bottom in order to secure the trays on the platform. Each tray 1000 can be designed to stay upright at all times, and each tray may be sealed until it's time to use the ingredients. Trays that are sealed may be utilize with a tray grabbing mechanism (e.g., see FIG. 11) to open them before use. While dimensional and shape variations of trays 1000 may require different cartridge structures, variations also provide that cartridges can support trays of varying size. The trays 1000 can also be formed from varying kinds of disposable or reusable materials, such as, for example, plastic, paper, bio plastic, Styrofoam, or other food-safe disposable material.

According to some examples, the tray 1000 includes raised bumps, ridges or surface features 1010 to prevent food items and liquids from sticking to the underlying tray surface. In some implementations, the tray 1000 includes a "soak pad" or other material designed to soak up moisture and reduce adhesion of the food to the tray surface. A pad may be formed to a ridged or bumped tray and/or contain ridges or bumps themselves. The pad may be adhered or attached to the tray to prevent depositing into the receptacle. The pad may be made of a disposable or dish-washable material.

The tray 1000 can include a removable cover (now shown) to enable food to be sealed until use. The cover may be removed by cutting (disposable/one time use tray) or prying action (reusable tray) by a mechanism installed in the device, in which case the cover will be added to the waste bin once removed.

Figure 10:
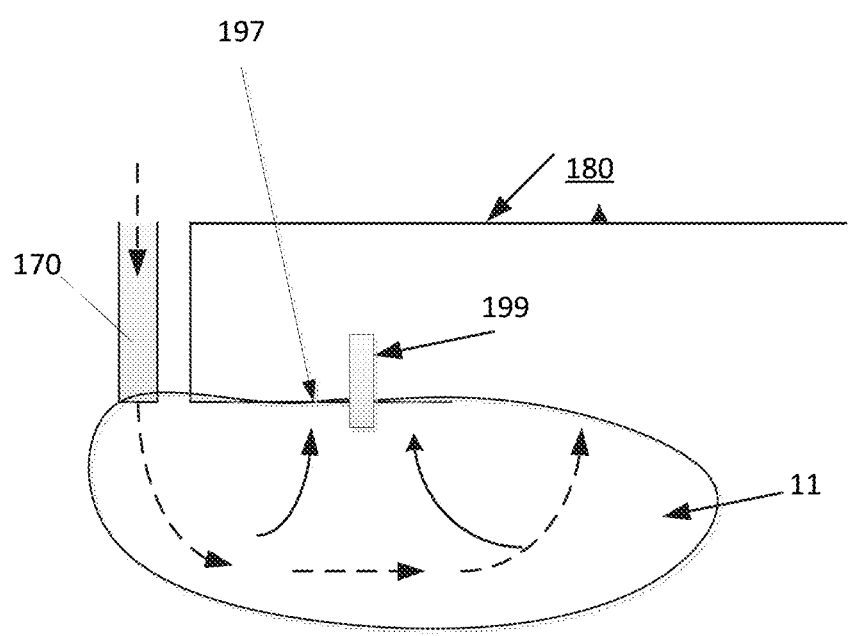
FIG. 10A through FIG. 10F illustrate alternative tray designs, in accordance with various embodiments.
Figure 10A:
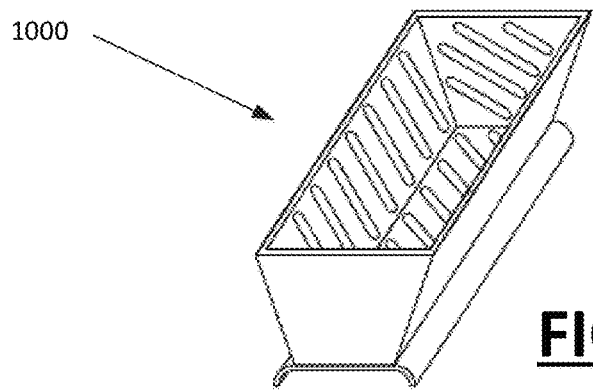
Figure 10B:
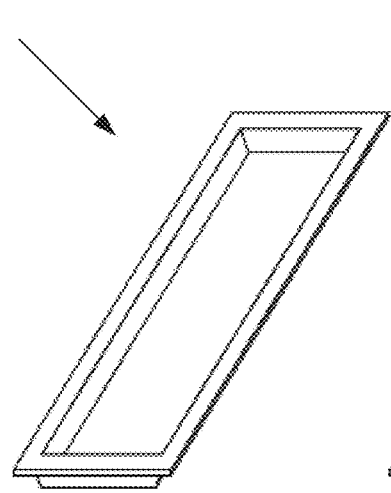
Figure 10C:
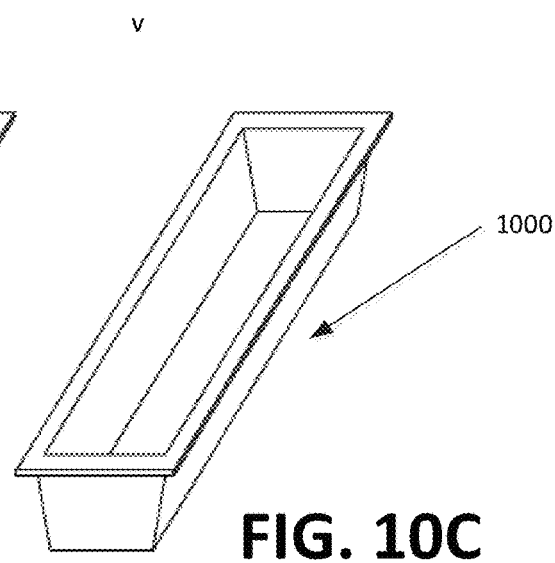
Figure 10D:
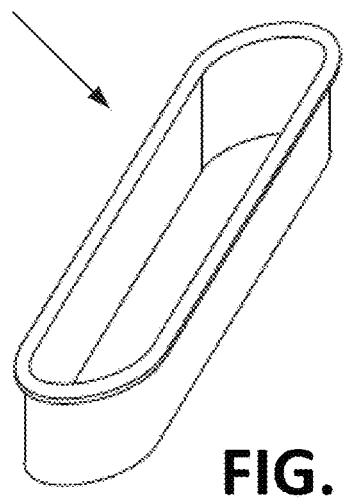
Figure 10E:
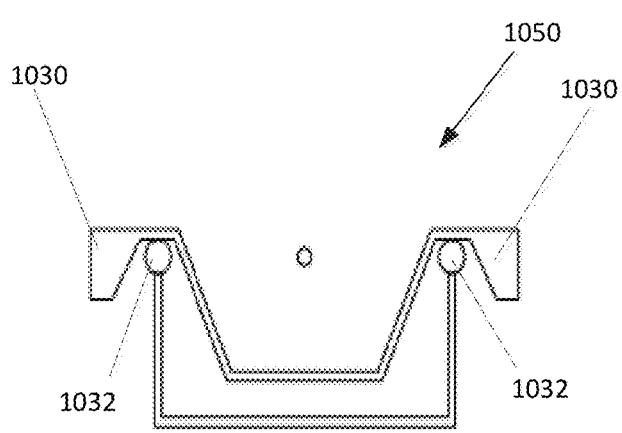

With reference to FIG. 10E, a tray 1050 includes a side or cross-section of a tray depicts tray lip structure 1030 which can engage tracks (see FIG. 11) of cartridges or other tray retention structures. As further illustrated by FIG. 10E, the outer perimeter of the tray 1000 can include wheels 1032 or other friction-reducing mechanisms to facilitate movement of the individual tray on the tracks of the cartridge.

Expansive Trays

Figure 10F:
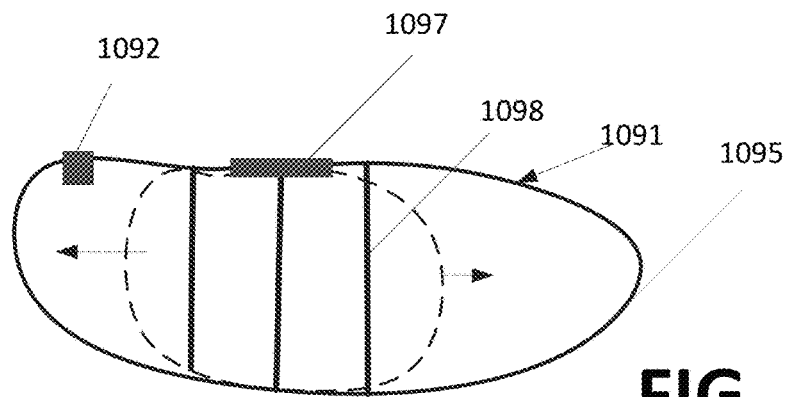

FIG. 10F illustrates an expansive tray for use with a food preparation device. According to some examples, a tray 1011 is provided with a vacuum seal to maintain its food contents in a fresh state and/or reduce the volume of the tray when it is loaded into the food preparation device 100. Still further, in some examples, the food preparation device 100 can implement an additional food extraction mechanism to leverage the expansive affect that results from puncturing the vacuumed containment of the tray and injecting air or other liquid. With reference to FIG. 10, a tray 1091 includes a seal 1092 that maintains a vacuum environment within a housing 1095 of the tray 1091. The seal 1092 and tray housing 1095 can be formed from a variety of different materials, with the seal 1092 being placed over an opening of the tray housing 1095 after the food item is inserted and the vacuum environment is created. The seal 1092 can be maintained with adhesive. As an addition or alternative, the seal 1092 can be formed with heat and/or through mechanical connection (e.g., interlocking seams). This seal may be broken right before the food contents are dispersed into the receptacle or within the food preparation device 100.

According to some examples, the housing 1095 of the tray 1091 can be made out of a malleable material that compresses when the vacuum is created and sealed. The housing 1095 for each tray 1091 may contain a disposable or reusable rigid frame 1098, made out of the same material, or alternatively, a more sturdy material like hard plastic, dense cardboard, metal, or other similar material. The rigid frame 1098 can, for example, be in the form of ribs, and may be used by the food preparation device 100 to hold the tray 1091 like it would if the tray housing was rigid. The rigid frame 1095 may also be used to ensure a consistent shape after the seal is broken. In variations, the rigid frame 1098 can also ensure the housing 1095 maintains its shape after an active inflation process. In other variations, the tray 1091 can be equipped with pads, liners, and other materials designed to enhance the preservation or dispensing capabilities of the tray 1091. The pads, liners and/or other materials may extend a depth of the tray (e.g., go to the bottom of the tray material) and also extend along the sides, with the rigid frame, and/or the seal/lid.

According to some examples, an air tube inlet 1097 can be provided to receive an air tube or conduit (e.g., provided by the food preparation device 100). Alternatively, the inlet 1097 can include a tube extension. Individual food trays can be provided the tube inlet (or air tube) prior to or after their placement into the food preparation device 100. The inlet 1097 can be used to generate a burst of air to inflate the vacuumed contents and inflate the inside of the tray chamber containing the food ingredients. The use of the airburst (or alternative gasses or liquids) can provide the active inflation process for the food preparation device 100. Then, the seal 1092 can be removed or punctured within the food preparation device 100 (e.g., using a puncture). Within the tray 1091, the malleable material of the housing 1095 expands when the seal is removed or punctured, and the air burst can be timed so that ingredients are forced out of the tray and into the receptacle.

While an example described provides for air to be used for the air tube 1097, variations provide for alternative gaseous or liquids to be injected into the 1091 when the seal is removed. For example, air may be replaced by water, oil, or any other liquid substance for specific trays to ensure the ingredients that are viscous, or will stick to the tray, will be fully dispensed into the receptacle. Recipes may have additional steps that specify which substance or medium may be used to dispense the ingredient, to ensure that additional liquids will not affect the recipe. For example, a recipe may recognize that using oil to force out garlic will add additional oil to the recipe, and so the recipe can compensate by relying solely on use of oil as the liquid that is injected when the seal 1097 is removed and the container loses its vacuum state.

As an alternative or addition, the food preparation device 100 may employ alternative extraction mechanisms with application of the inflation process. For example, an apparatus on the machine may scoop or push the ingredients through the opening created by lifting the external seal, either by reaching into the tray through the opening or pushing the tray material the food items through the back of the opening (turning the tray inside out). This apparatus may be in addition to the robot arm, or it may be the robot arm running a special program.

The housing 1095 of the tray 1091 can also include retention or engagement structures 1089 for enabling the structure to be received and utilizes by a compatible mechanical interface within the food preparation device 100. For example, the tray 1091 can include a lip, track, slideable fasteners or other retention mechanisms to engage a corresponding tray retention structure of the food preparation device.

Tray Retention

Figure 11:
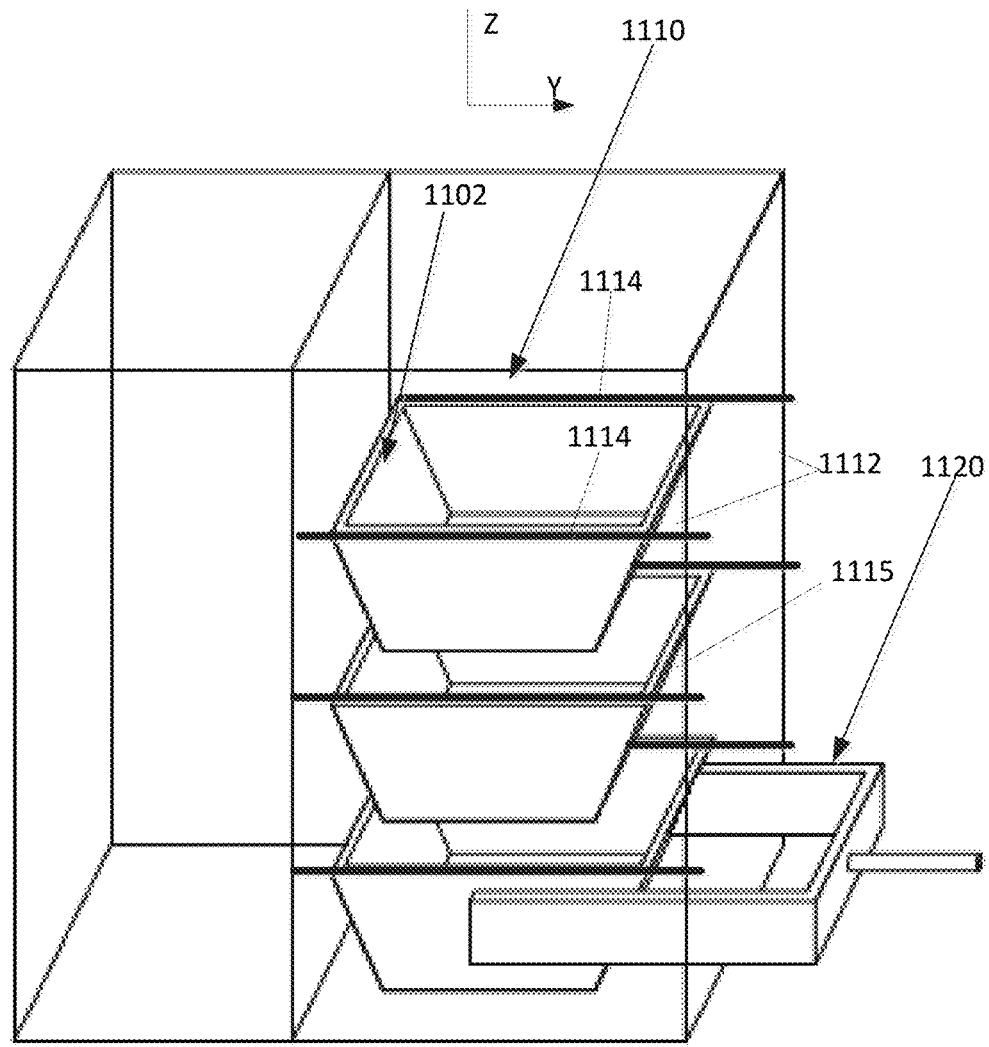
FIG. 11 illustrates a tray retention structure to enable individual trays to be securely received and retained for operational use, according to one or more examples.

FIG. 11 illustrates a tray retention structure 1110 to enable individual trays to be securely received and retained for operational use, according to one or more examples. In an example of FIG. 11, the tray retention structure 1110 is aligned in a vertical orientation, so that trays are vertically stacked in shelf formation. The food preparation device 100 (or cartridge) can include a locking structure as shown with an example of FIG. 11. In more detail, a tray retention structure 1110 (e.g., which can be an integrated portion of the food preparation device 100 and/or cartridge) includes receiving structures 1115, defined by rails 1112 and tracks 1114, to receive specifically designed trays 1102, having perimeter structures for engaging and being retained by the tracks 1114. Each receiving structure 1115 can be defined by characteristics of dimension, as well as latching mechanism, platform (or base, other than tracks, if present) and other features. The receiving structures 1115 can optionally retain trays of varying types (e.g., paper or plastic) or dimensions (e.g., square or rectangular). The cooperation between the tracks 1114 and the trays 1102 secure the trays until it is time to dispense the contents. In an example of FIG. 11, the tray retention structure 1110 includes a forward feeding stack which can be configured so that trays are loaded in from the top (Z) in sequential order, and the lowest tray is dispensed from the front (Y) for consumption by the food preparation device.

In one implementation, a tray-grabbing apparatus 1120 ("grabber 1120") can operate from within a housing of the food preparation device 100. The grabber 1120 can intake full trays 1102 and output empty trays 1102. In one configuration, the grabber 1120 implements a pushing mechanism to push an empty tray 1102 through the initial stack and into a waste area 1105, which in turn causes the next tray to fall into place. In the vertical orientation shown by an example of FIG. 11, the grabber 1120 can optionally move in the vertical direction in order to grab individual trays.

The tray retention structure 1110 can employ a latch mechanism or feature to secure trays for the carousel. In one implementation, a set of hooks latch onto a corresponding set of loops which are built into the tray 1102. With the hook and loop coupling, the tray 1102 is held onto the carousel until the grabber 1120 accesses the tray 1102. The grabber 1120 can intake a tray 1102 by engaging a perimeter lip structure of the tray 1102 from the front side, lifting the tray slightly, and then pulling it into the cooking container. The grabber 1120 can alternatively replace a given tray 1102 in the same way: first by lifting up, push into the tray storage compartment, and then lower onto the hooks.

In some implementations, a ratcheting mechanism (not shown) can be provided with a tray retention structure (or carousel variation) in order to yield and release a tray 1102 in response to an insertion force in a given direction. In one implementation, a ratcheting mechanism can yield when a tray 1102 is pushed down on the carousel or stack, and not yield to upward pressure from the tray 1102. The grabber 1120 can release the tray 1102 by pushing the tray 1102 into the ratchet, and thereby releasing the ratchet mechanism. The grabber 1120 can then pull the now freed tray from the carousel or stack.

Alternative Tray Configurations

A food preparation device or system can access or utilize an arrangement of cubicles, called a tray grid, as an addition or variation to a carousel or stack. In such variations, the food preparation device 100 can employ the grabber 1120, which can be mounted on a 2-dimensional gantry mechanism to access individual cubicles. Prior to operation, cubicles can be mapped to containers or trays which contain specific food items. The grabber 1120 can be implemented as a robotic component that receives input, navigates to the correct cubicle, and pulls out a specifically selected tray at a particular location. The input received by the grabber 1120 can specify the food item or the cubicle. The grabber 1120 can dump the contents into the tray, and then place the empty tray back in the original cubicle. In use, the user can load trays directly into the cubicles (from the side, back or top of the device). Alternatively, a box of trays (presorted into cubicles) can be placed into the storage compartment without removing the individual trays (i.e. a cartridge of trays).

In some variations, the contents of the trays may be unknown, or the computing resources of the food preparation device 100 may lose track of the trays. In some embodiments, the food preparation device 100 includes sensors (weight, vision, barcode, RFID, etc.) to check and verify that the ingredients of a sealed tray or correct. This check may be based on information provided on or with the tray (e.g., barcode or QR code information, RFID signal, etc.), or by inspection of the ingredient itself. The food preparation device can utilize the sensor information to check that the ingredients are the ones called for in a given recipe, that the trays 1102 are loaded correctly (and not overloaded), that the quantity of food items provided by the trays 1102 are sufficient for the tray 1102, that the cut is correct for the recipe, and/or that the ingredients will fall freely from the tray (e.g. contents are not jammed in the tray). When checks fail, a variety of operations can be performed, for varying levels of concern. In one implementation, when the check fails, the user may be alerted by an audible or visual notification. In such implementations, the user can override check and verification alarms and proceed through the cooking process.

According to some implementations, a tray 1102 can contain some passive indicator of quality, based on the time since the tray was packed or sealed, as well as the storage temperature of the tray 1102 and the context or manner in which the tray was packed. In this way, each tray 1102 can be provided with specific information and/or instructions regarding temperature and time storage requirements/limitations for the particular tray. Some examples for tracking and conveying information about the trays 1102 is provided below.

In some variations, disposable prepackaged trays 1102 may contain a visual indicator that changes color based on temperature ("spoilage indicator"). If a tray is ever stored for an unsafe period of time at an unsafe temperature, the color of the indicator may change to provide visual record of this unsafe storage. By way of example, the colors and meanings may include the following (i) Green as an indicator that the ingredients are fresh and ready to use; (ii) Yellow as an indicator that the ingredients may have been stored at an unsafe temperature for some period of time; and/or (iii) red as an indicator the ingredients have likely spoiled and should not be used. The scale used to determine these colors may vary based on the ingredients (e.g. meat spoils much easier than pasta and grains).

In other examples, the disposable/prepackaged trays can contain a visual indicator that changes based on the time from when the tray 1102 was packaged ("expiration indicator"). This indicator may resemble a bar of ink. It may use ink or markings that deteriorate or dissolve over time. The indicator using this technology would contain enough ink such that when it is gone, the product is past its expiration date. Among other benefits, such an ink-based indicator would provide reliable information about food safety without use of electronics.

Still further, in other examples, reusable trays contain slots or fixtures that can hold reusable indicators. Indicators may be sold as separate replaceable placards, stamps, stickers, or medallions. Because of the variable nature of the indicators, users may be able to buy expiration indicators in units of 1 day (e.g. a 5 day indicator, 7 day indicator, 30 day indicator, etc.). Users may be able to buy spoilage indicators based on the optimum target temperature, or the type of food (e.g. beef, chicken, vegetables) being monitored. Additionally, in some variations, the food preparation device 100 can monitor the ingredients being loaded into the trays for spoilage or expiration. The monitoring can be done by detecting, for example, indicators, codes or other information about when trays 1102 were sealed or last used. The device may be configured to only accept unspoiled, unexpired ingredients, or accept some range of spoilage or expiration (e.g. can accept up to yellow spoilage, or up to 5 days after the expiration date). These ranges may be settable (adjustable) for types of ingredients (e.g. meat must be green, vegetables can be yellow, rice can be red). This configuration may be set by the administrator of the device (i.e. an administrator may never allow spoiled food, for liability purposes) or may be set based on a user's personalization preferences (i.e. a user may be comfortable with questionable vegetables). The personalization may contain safeguards to not allow the user to create unsafe foods.

As another example, an alphanumeric sequence code can be associated with an ingredient, and the presence of the code in connection with a given tray can signify the ingredient as present in, for example, a sealed tray 1102. The code can specify the ingredient, as well as secondary information such as the cut or chop of the ingredient, or special attributes about the ingredient (low salt, no sugar added, organic, strain or cultivar, place of origin, place of processing/packaging, etc.). This code may be specified when creating recipes (for automatic ingredient picking), Cooking on the Fly, or during collaboration. The code can also be associated with electronically generated or stored recipe data structures. The presence of the code can signal data and/or instructions to cause the food preparation device 100 to use the particular tray 1102 when, for example, implementing a recipe. The food preparation device can also verify that the ingredients are loaded into the system, and/or that the food item of the tray 1102 is the right type (cut, organic/not, etc.) of that ingredient.

The food preparation system 200 can implement a platform to support tray identification. The tray identification can be implemented by, for example, a processing resource associated with the food preparation device 100. The identification can specify, for example, a) the type of ingredient in that tray and b) if the tray is disposable. According to one implementation, a tray 1102 can be identifiable by an ingredient code that corresponds to the ingredient contained in that tray. A tray 1102 can be labeled with a barcode or electronic tag that can be read by the device to pull a tray from the pantry or to validate that the tray is right for the given recipe.

In some variations, a tray 1102 can be identifiable as disposable in order to select instructions for the food preparation device 100. The instructions can specify whether to, for example, cut or pry the lid. In one implementation, the device can employ a small magnetic sensor in the carousel or stack, and reusable trays may contain a small magnet in the bottom of the tray. When the device senses that a magnet is placed against the magnetic sensor, it will treat the tray as a reusable tray and inhibit cutting the tray lid.

According to various implementations, the prepackaged trays can contain the identifiable marking as an embedded tag or printed barcode. Reusable trays can contain a slot or compartment for the user to insert a printed barcode, label, or other marking. Reusable trays can also include a system of depressible dots (buttons, depressions) that can be used to indicate the contents of the tray. These dots can be depressed in by the user, and then pressed out for reuse when the tray 1102 is cleaned and serviced. The device will read the depressions, similar to how a barcode or electronic tag may be interpreted. In an implementation, the raised dots may additionally or alternatively indicate the position and/or orientation of the tray. For example, a device may read or interpret the dots to obtain information for the position and/or orientation of the tray.

Numerous configurations are described in this application with respect to cartridges, cubicles or other structures which retain a collection of trays. In order for processing resources of the food preparation system 200 to discern trays, a tray addressing system can be employed. According to the tray addressing system, each tray location in a cartridge, cubicle (or cubicle array) can be identified by the tray cutout, and positioned within the tray cutout. Tray cutouts may be lettered starting with A (e.g. A, B, and C) and positions may be numbered starting from the bottom (e.g. 1, 2, and 3). Tray addresses may be included in a recipe (e.g. place spaghetti in A1 and sauce in B1 and cheese in B2). Tray addresses may also be remapped within the computer interface software of the food preparation device 100 in order to enable multiple meals or alternate configurations.

With additional reference to FIGS. 8A-8C, modularized or auxiliary components of a food preparation system 200 can use an identification and/or addressing mechanism to enable trays 1102 to be inventories and retrieved when needed. In this way, the trays 1102 can be stored within, for example, a pantry module which maintains a refrigerated or chilled environment. In variations, the pantry can be used for warming. A pantry module can include a cartridge, or cubicle which supports addressing and tray identification.

In some examples, the pantry can be combined with the cartridge to accept cooked ingredients from the cooking surface for cooling. For example, the manipulator 138 can scoop and place food into an empty tray, and tray gets loaded into the carousel or stack through the tray to cooking opening. A carousel or wheel rotates the tray to the appropriate opening and moves the entire tray and contents through the opening into the refrigerated pantry.

With reference to FIG. 11, the grabber 1120 can slide along the affixed rails in the cooking compartment, in order to grab a specified tray 1102. In variations such as shown by FIG. 12A and FIG. 12B, the grabber 1120 can remove a tray 1202 from a cartridge 1210, and then pulls the tray 1202 into a cooking compartment of a food preparation device 100.

Once the tray 1102, 1202 is within the food preparation device 100, one or more embodiments provide for the food preparation device 100 to cut or pry the container open. Additionally, the food preparation device 100 can rotate the respective tray 1102, 1202 to deposit the contents into the center of the cooking surface. In variations, the food preparation device 100 can employ motorized mechanisms to jerk or shake the respective tray 1102, 1202 once the lid is cut or unsealed to facilitate the contents being dispersed into the receptacle of the food preparation system 200. The food preparation device 100 can also employ jerking or shaking to loosen the food from the tray. The grabber 1220 can insert the now empty tray back into the cartridge at the position from which it was grabbed. In variations, the grabber 1120, 1220 can cut or lift the lid on the tray 1102, 1202, in order to access the contents. The apparatus may use the cutter/lifter as a scraper to remove food from the tray. The grabber 1120, 1220 can position covers over unused tray slots, to prevent cross contamination and improve aesthetic.

Figure 12A:
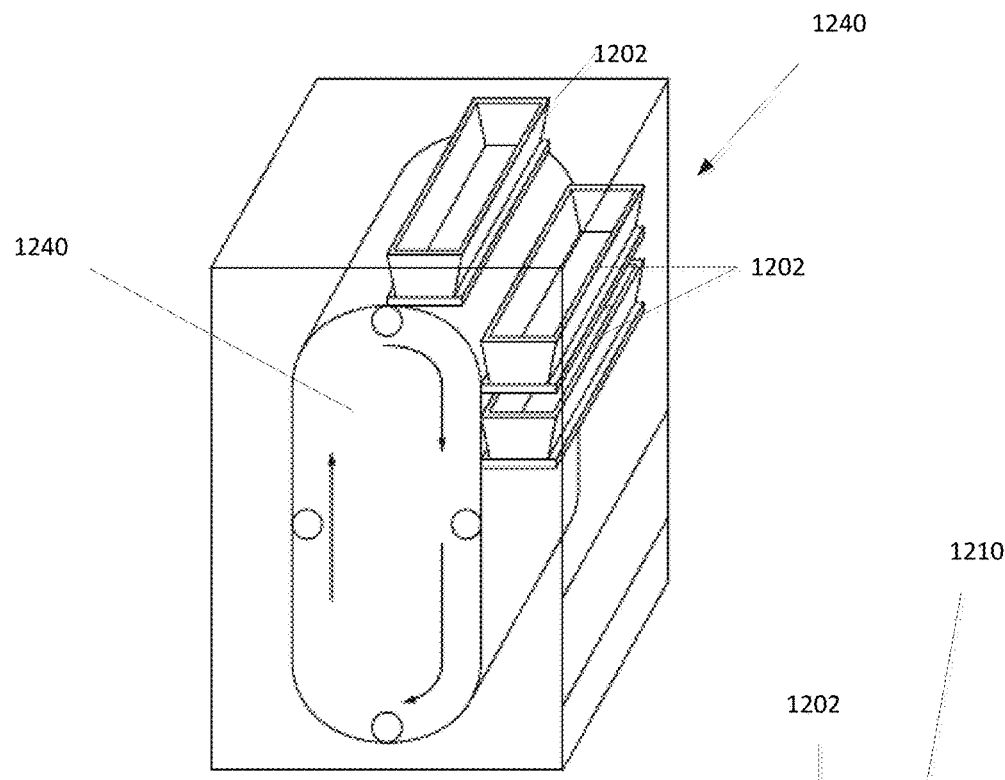
FIG. 12A and FIG. 12B, illustrate alternative tray retention structures, according to variations.
Figure 12B:
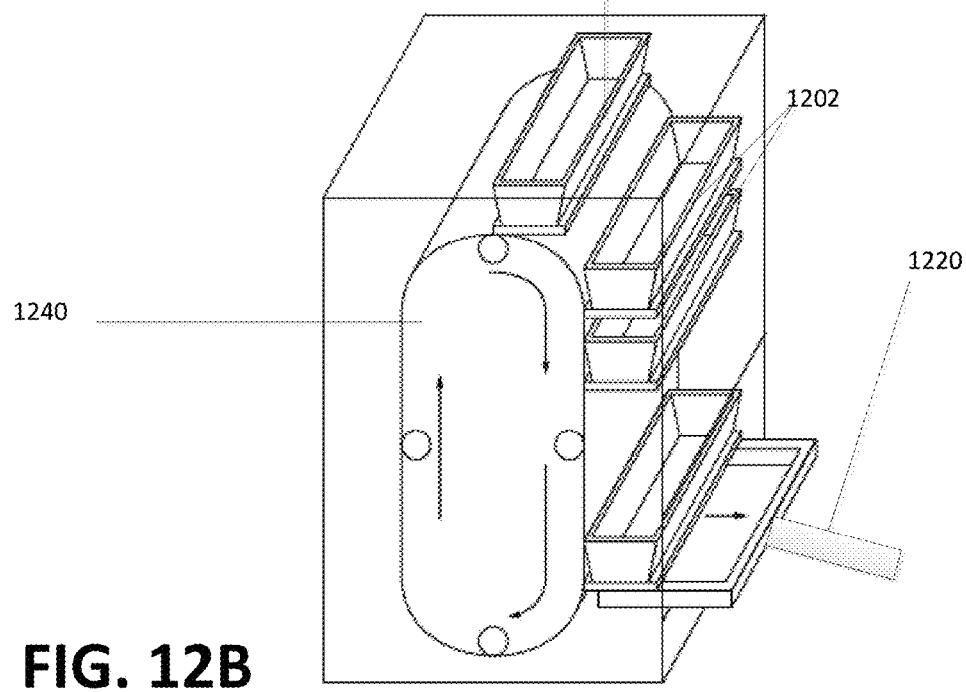

With further reference to an example of FIG. 12A and FIG. 12B, an alternative tray retention structure 1210 includes a wheel structure 1240 as a cartridge from which trays 1202 can be retained and retrieved. The cartridge can support each tray 1202 with a platform 1205. Each platform 1205 can rotate on its own axis to stay level as the wheel rotates, so that the trays 1202 stay upright at various possible positions on the wheel-shaped cartridge. Alternatively, the trays 1202 may also point toward a specific marker, such as the center or side of the rotating platform, and rotate away from the cooking compartment opening before it disposes ingredients at an angle over the receptacle. In an example of FIG. 12A and FIG. 12B, the grabber 1220 can extend to grab onto a selected tray 1202 as the wheel-shaped cartridge 1240 rotates.

In FIG. 12A and FIG. 12B, the grabber 1220 can push the individual trays 1202 onto, for example, a blade/lifter mechanism to cut or lift the top (if present) off of the tray, before dispensing the contents. The grabber 1220 can push the tray out into the cooking compartment, and tilt to dispense the contents into the cooking receptacle. The grabber 1220 can be mounted on rails, belts or other guides to guide itself with the tray onto the correct spot in the cooking receptacle. Once deployed, the grabber 1220 can retract with the now empty tray into the center, side, or bottom of a storage compartment, and further deposit the empty tray onto the platform, or into the center, back, or bottom trash receptacle. If the empty tray is deposited onto the tray platform, a secondary grabbing mechanism may be employed to move the tray into the garbage later in the process.

In variations of FIG. 12A and FIG. 12B, the tray grabber 1220 can be mounted on a track, chain, belt, ratchet, or other mechanism (the "track"), similar to tray tracks. The track may run vertically, horizontally, or in a loop like motion around the tray stacks, and may run around the top, bottom or sides of tray stacks (to move trays around the compartment). There may be multiple tray selector tracks and multiple grabbers working in tandem to access trays in one or more stacks in the compartment. There may be track junctions where the grabber 1220 can move from one track to another track to access other trays. Additionally, there may be one or more additional mechanisms at the opening to the food preparation device.

With respect to any of the examples described, the grabber 1120, 1220 can be implemented using one or more of clamps, clips, holes, grooves, magnets, or undermounts which lock temporarily onto the tray, and can be locked an unlocked by mechanical forces exerted from the grabber 1220.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A food preparation system comprising:
   A) a food preparation device including:
      a housing including one or more receiving structures dimensioned to receive any one of a plurality of trays containing food items, the one or more receiving structures being configured to maneuver the one or more trays internally to dispose their food items stored within the one or more trays into a food preparation receptacle;
      an extraction mechanism to extract the food items from individual trays into a preparation receptacle;
      a heating mechanism to heat the preparation receptacle; and
      a processing resource to control (i) the extraction mechanism in extracting the food item from individual contains, and (ii) the heating mechanism in heating the extracted food items in the preparation receptacle; and
   B) the plurality of trays containing food items;
   wherein each tray of the plurality of trays is pre-packaged and includes:
      a tray housing formed from (i) a rigid frame, and (ii) expandable and malleable material that retains the food item of the tray in a vacuum state;
      a seal positioned at an opening of the tray housing to maintain the vacuum state of the tray housing; and
      a retention structure provided at a perimeter of the tray housing to enable the tray housing to be received and retained by the one or more receiving structures of the food preparation device.

2. The food preparation system of claim 1, wherein the rigid frame is formed from a reusable material.

3. The food preparation system of claim 1, wherein the rigid frame is formed from a malleable material.

4. The food preparation system of claim 1, wherein the tray housing includes an inlet to receive a liquid or gas.

5. The food preparation system of claim 4, wherein the food preparation device includes an extraction mechanism that forces the liquid or gas into the tray housing through the inlet.

6. The food preparation system of claim 5, wherein the extraction mechanism uses a second mechanism to pull or push contents in the tray housing.

7. The food preparation system of claim 6, wherein the second mechanism includes a scraper.

8. The food preparation system of claim 5, wherein the extraction mechanism includes a puncture that pierces the seal of the tray housing while the food preparation device forces gas or liquid into the tray housing.

9. The food preparation system of claim 6, wherein the second mechanism includes a vacuum suction.

10. The food preparation system of claim 1, wherein the rigid frame is formed from a material studier than the tray housing.

11. The food preparation system of claim 1, wherein the rigid frame includes one or more rib structures.

* * * * *